US007247181B2

(12) United States Patent
Hansen et al.

(10) Patent No.: US 7,247,181 B2
(45) Date of Patent: Jul. 24, 2007

(54) CYCLONIC DIRT SEPARATION MODULE

(75) Inventors: Samuel N. Hansen, Jenison, MI (US); Gary L. Smith, Belding, MI (US); Eric R. Metzger, Sand Lake, MI (US); David E. McDowell, Grand Rapids, MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 328 days.

(21) Appl. No.: 10/904,689

(22) Filed: Nov. 23, 2004

(65) Prior Publication Data
US 2005/0125939 A1 Jun. 16, 2005

Related U.S. Application Data

(63) Continuation of application No. 10/249,113, filed on Mar. 17, 2003, now abandoned, which is a continuation-in-part of application No. 09/849,143, filed on May 4, 2001, now abandoned.

(60) Provisional application No. 60/201,933, filed on May 5, 2000, provisional application No. 60/269,044, filed on Feb. 15, 2001.

(51) Int. Cl.
*B01D 45/12* (2006.01)

(52) U.S. Cl. .............................. 55/337; 55/345; 55/426; 55/429; 55/459.1; 55/472; 55/482; 55/525; 55/DIG. 3

(58) Field of Classification Search ................. 55/337, 55/345, 426, 429, 459.1, 472, 482, 525, DIG. 3; 15/350, 353
See application file for complete search history.

(56) References Cited

U.S. PATENT DOCUMENTS

| 2,071,975 | A | 2/1937 | Holm-Hansen et al. |
| 2,171,248 | A | 8/1939 | Van Berkel |
| 2,943,698 | A | 7/1960 | Bishop |
| 4,172,710 | A | 10/1979 | van der Molen |
| 4,944,780 | A | 7/1990 | Usmani |
| 5,267,371 | A | 12/1993 | Soler et al. |
| 5,779,745 | A | 7/1998 | Kilstrom |
| 6,003,196 | A | 12/1999 | Wright et al. |
| 6,026,540 | A | 2/2000 | Wright et al. |
| 6,070,291 | A | 6/2000 | Bair et al. |
| 6,192,550 | B1 | 2/2001 | Hamada et al. |
| 6,289,553 | B1 | 9/2001 | Dyson |
| 6,341,404 | B1 | 1/2002 | Salo et al. |
| 6,563,622 | B2 | 5/2003 | Dyson et al. |
| 6,607,572 | B2 * | 8/2003 | Gammack et al. ............ 55/343 |

* cited by examiner

*Primary Examiner*—Robert A. Hopkins
(74) *Attorney, Agent, or Firm*—McGarry Bair PC

(57) ABSTRACT

The invention relates to dirt separator module comprising a dirt-separation housing having an inlet and an outlet opening and defining a cyclonic airflow separator, and a suction source fluidly connected with the dirt-separation housing. A separator plate and a cylindrical wall of the dirt-separation housing form a toroidal cyclonic airflow chamber in the dirt-separator for aiding in the separation of dirt from a suction airstream developed by the suction source. The separator plate has an outer diameter smaller than the inner diameter of the cylindrical wall of the dirt-separation housing, creating a gap between the outer edge of the separator plate and the inner wall of the dirt tank. A further embodiment includes dual cyclonic separators fluidly connected through a filter assembly. A further embodiment includes a cyclonic separator in the form of a tangential helical ramp.

37 Claims, 21 Drawing Sheets

CYCLONIC DIRT SEPARATION MODULE

CROSS REFERENCE TO RELATED APPLICATIONS

This application is a continuation of Ser. No 10/249,113, filed Mar. 17, 2003, now abandoned which a continuation in part of Ser. No. 09/849,143, filed May 4, 2001 now abandoned, which claims the benefit of U.S. Provisional Application 60/201,933, filed May 5, 2000 and U.S. Provisional Application 60/269,044, filed Feb. 15, 2001, all of which are incorporated herein in their entirety by reference.

FIELD OF THE INVENTION

The invention relates to suction cleaners, and in particular to a separator for a suction cleaner. In one of its aspects, the invention relates to a separator with a cyclonic airflow path to separate dirt and debris from air drawn into the cleaner. In another of its aspects, the invention relates to a separator that deposits the dirt and debris in a collection receptacle. In another of its aspects, the invention relates to a separator including a supplementary fine particle filter.

DESCRIPTION OF THE RELATED ART

U.S. Pat. No. 4,172,710 to van der Molen discloses an upright vacuum cleaner with a wheeled base with a suction opening and a handle pivotally mounted to the base. A cyclone separator is mounted on the handle to remove dust and dirt from an airstream that is withdrawn through the suction opening in the base. The cyclone separator is formed by a cylindrical housing that has a tangential inlet in the cylindrical side wall and a central outlet at an upper portion of the housing. A motor driven suction source is mounted above the cyclone separator and is in communication with the central outlet of the cyclone separator to draw dust-laden air from the suction opening through the cyclone separator. A cylindrical screen filter is positioned within the cyclone separator between an outer cyclone chamber and the central outlet to screen entrained particles the have not been separated in the cyclone chamber from the air. A removable dirt cup below the cyclone separator collects the dust and dirt separated from the air.

Other upright vacuum cleaners with cyclonic separator mounted on an upright handle and with post cyclone separators mounted in cyclone separator housing are disclosed in the U.S. Pat. No. 6,563,622 to Dyson, U.S. Pat. No. 6,003,196 to Wright et al., U.S. Pat. No. 6,341,404 to Salo et al. and U.S. Pat. No. 6,026,540 to Wright et al.

U.S. Pat. No. 2,071,975 discloses a canister vacuum cleaner that has a wheeled base with a suction nozzle opening and a canister cyclone separator connected to the suction nozzle opening through a hose. The cyclone separator has a cyclone separation housing in which entrained dirt is separated from air and a dirt cup below the cyclone separation housing for collecting the thus separated dirt. The air is removed from the cyclone separation housing through a central tubular member that is formed by a series of baffles through which the air enters the tubular member. A disc is mounted to the bottom of the tubular member and acts as a baffle between the dirt cup and the cyclone separator.

U.S. Pat. No. 4,944,780, issued Jul. 31, 1990, to Usmani, discloses a central vacuum system having a cylindrical dirt tank with an interior cylindrical wall adjacent to a tangential inlet. Dirt-laden air drawn into the tangential inlet circulates about the interior of the cylindrical tank to the outside of the interior cylindrical wall. Entrained particulates are separated from the airstream and drop to the bottom of the cylindrical dirt tank. Exhaust air, which may carry smaller particulates, is drawn through a pleated cylindrical filter that is carried on a spindle inside the interior cylindrical wall. Waste air that passes through the filter is drawn through an exhaust opening and is exhausted from the central vacuum cleaner through an exhaust outlet.

U.S. Pat. No. 2,943,698, issued Jul. 5, 1968, to Bishop discloses a cylindrical dirt tank having a tangential air inlet, an interior frusto-conical shield, and a cylindrical filter element held in place by a frame comprising a cylindrical wire mesh or perforate screen. After dirt-laden air is introduced into the tank through the inlet, heavier dirt particles fall into a bottom portion of the dirt tank while waste air and any fine particles left in the waste air are exhausted through an air exhaust outlet. The filter element is interposed between the dirt tank and the air exhaust outlet to filter fine particles from the exhaust air.

SUMMARY OF THE INVENTION

According to the invention, a vacuum cleaner module comprises a module housing, a dirt-separation housing removably mounted in the module housing and defining a cyclonic airflow chamber for separating contaminants from a dirt-containing airstream and including an inlet opening for the cyclonic chamber adapted to be connected to a suction cleaning nozzle and an airstream outlet opening in an upper central portion of the dirt-separation housing and in communication with the inlet opening. An airstream suction source is mounted in the dirt-separation housing and is fluidly connected to the cyclonic chamber inlet opening, the cyclonic airflow chamber and the airstream outlet opening to establish and maintain a tangential flow of a dirt-containing airstream within the cyclone airflow chamber as the airstream flows between the cyclonic chamber inlet opening and the airstream outlet opening for separating dirt from the airstream in the cyclonic airflow chamber. A dirt-collecting chamber is mounted within the dirt-separation housing and beneath the cyclonic airflow chamber to collect dirt separated from the dirt-containing airstream in the cyclonic airflow chamber. A support element is mounted in an upper portion of the dirt separator housing and mounts a separator plate at a lower portion thereof above the dirt-collecting bin, and separating the cyclonic airflow chamber from the dirt-collecting chamber.

In one embodiment of the invention, the support element is cylindrical and has openings for passage of the dirt-separated airstream prior to exit of said airstream from said dirt-separation housing through the airstream outlet. A filter element can be positioned between the cyclonic airflow chamber and the support element. In one embodiment, the filter element is a fine mesh.

In a preferred embodiment, the separator plate extends radially from the support element toward a side wall of the housing. The separator plate forms a gap with the housing side wall for passage of dirt particles from the cyclone separation chamber to the dirt-collecting chamber. The side wall of the housing is cylindrical at the separator plate and the gap between the separator plate and the housing side wall is annular. Thus, the separator plate is circular and the housing has a cylindrical wall adjacent the separator plate.

In a preferred embodiment of the invention, the relative cross-sectional areas of the separator plate with respect to the housing cross sectional area at the separator plate is generally in the range of 0.75 to 0.95. Preferably, the relative cross-sectional area of the separator plate with respect to the housing cross sectional area is in the range of 0.8 to 0.92. In a most preferred embodiment of the invention, the relative cross-sectional area of the separator plate with respect to the housing cross sectional area is about 9.

In another preferred embodiment, the cylindrical support element, the separator plate and the dirt-separation housing define a toroidal cyclonic airflow chamber that forms the cyclonic airflow chamber. In a one embodiment, a filter is positioned between the cyclonic airflow chamber and the airstream outlet opening. The filter can be a fine mesh.

In a preferred embodiment of the invention, a filter is positioned downstream of the airstream outlet opening and upstream of the suction source.

Preferably, the suction source is mounted beneath the dirt-separation housing. Typically, the suction source has an inlet downstream from the airstream opening to draw the dirt-containing airstream into the cyclonic airflow chamber.

In one embodiment of the invention, the dirt-separation housing also defines the dirt-collecting chamber. In another embodiment of the invention, a dirt cup defines the dirt-collecting chamber and the dirt cup is removably mounted to the dirt-separation housing and is also or alternately removably mounted to the module housing.

The vacuum cleaner module is adapted to be used with a suction nozzle that can be a part of a base that is movable along a floor surface or with a tool on the end of a hose for above floor cleaning.

Further according to the invention, the dirt separation housing further comprises a second cyclonic airflow chamber having an airstream inlet in fluid communication with the outlet of the first cyclonic airflow chamber and an airstream outlet in communication with the airstream suction source.

In one embodiment, the second cyclonic airflow chamber is at least in part defined by a frustroconical wall that decreases in diameter from a lower end to an upper end.

Preferably, a fluid passage is positioned between the airstream outlet of the first cyclonic airflow chamber and the airflow inlet of the second cyclonic airflow chamber;

Further according to the invention, a vacuum cleaner comprises a dirt separator housing defining a cyclonic airflow chamber for separating contaminants from a dirt-containing airstream includes a cyclonic chamber inlet and an airstream outlet in fluid communication with each other. An airstream suction source is fluidly connected to the cyclonic airflow chamber for transporting dirt-containing air from a source of a dirt-containing airstream to the cyclonic airflow chamber. The suction source is adapted to selectively establish and maintain the dirt-containing airstream from the source of the dirt-containing airstream to said cyclonic chamber inlet and for maintaining tangential flow of the dirt-containing airstream within the cyclone airflow chamber for separating dirt from the air stream in the cyclonic airflow chamber. A support element is positioned within said dirt-separation housing and mounts a separator plate that forms a toroidal chamber within the dirt-separation housing with a cylindrical side wall and upper wall of the dirt-separation housing. A dirt-collecting bin is positioned beneath the separator plate within the dirt-separation housing and forms a dirt-collecting chamber. In a preferred embodiment of the invention, the relative cross-sectional areas of the separator plate with respect to the housing cross sectional area at the separator plate is generally in the range of 0.75 to 0.95. Preferably, the relative cross-sectional area of the separator plate with respect to the housing cross sectional area is in the range of 0.8 to 0.92. In a preferred embodiment of the invention, the relative cross-sectional area of the separator plate with respect to the housing cross sectional area is about 9.

In one embodiment of this invention, the airstream outlet is in a lower portion of the housing.

In a further embodiment, a separator plate is positioned between the first cyclonic airflow chamber and the first dirt-collecting bin. The relative cross-sectional area of the separator plate with respect to the housing is in the range of 0.75 to 0.95.

In a further embodiment according to the invention, the cyclonic airflow chamber is formed by a tangential helical ramp.

In a further embodiment, there is a direction change portal between the cyclonic airflow chamber and the airstream outlet opening in the dirt separation housing so that the airstream changes whereby the airstream changes direction before passing through the airstream outlet opening.

Still further according to the invention, a vacuum cleaner comprises a housing defining a first cyclonic airflow chamber for separating contaminants from a dirt-containing airstream, the housing including an airstream inlet and an airstream outlet a nozzle base including a suction opening that is fluidly connected with the airstream inlet of the first cyclonic airflow chamber. The housing further includes a second cyclonic airflow chamber having an airstream inlet in fluid communication with the outlet of the first cyclonic airflow chamber and an airstream outlet. The second cyclonic airflow chamber is at least in part defined by a frustroconical wall that decreases in diameter from a lower end to an upper end. A fluid passage within the housing extends between the airstream outlet of the first cyclonic airflow chamber and the airflow inlet of the second cyclonic airflow chamber. A first dirt-collecting bin is positioned beneath the first cyclonic airflow chamber for collecting dirt separated from the airstream in the first cyclonic airflow chamber and an airstream suction source is fluidly connected to the suction opening and to the first and second cyclonic airflow chambers for transporting the dirt-containing airstream from the suction opening through the first and second cyclonic airflow chamber. The suction source is adapted to selectively establish and maintain the flow of the dirt-containing airstream from the suction opening through said first and second cyclonic airflow chambers.

In one embodiment, the airstream suction source is downstream of the outlet of the second cyclonic airflow chamber.

In another embodiment, the outlet of the first cyclonic airflow chamber if formed by a perforated wall. Preferably, the first cyclonic airflow chamber is formed at least in part from a substantially cylindrical housing wall and the perforated wall is spaced radially inwardly of the substantially cylindrical housing wall. Typically, the perforated wall is substantially cylindrically shaped but other shapes of the perforated wall can be used.

In a preferred embodiment, the second cyclonic airflow chamber has an opening at an upper portion thereof for passage of dirt separated from the airstream. Further, a second dirt-collecting bin is in communication with an upper end of the second cyclonic air flow chamber for collection of dirt from the airstream in the second cyclonic airflow chamber. In one embodiment of the invention, the frustoconical wall also defines a wall of the second dirt-collecting bin. Further, the second dirt-collecting bin is axially spaced from the first dirt-collecting bin. Most preferably, the second dirt-collecting bin is positioned axially above the first dirt-collecting bin.

DESCRIPTION OF THE PREFERRED EMBODIMENT

Figure 1:
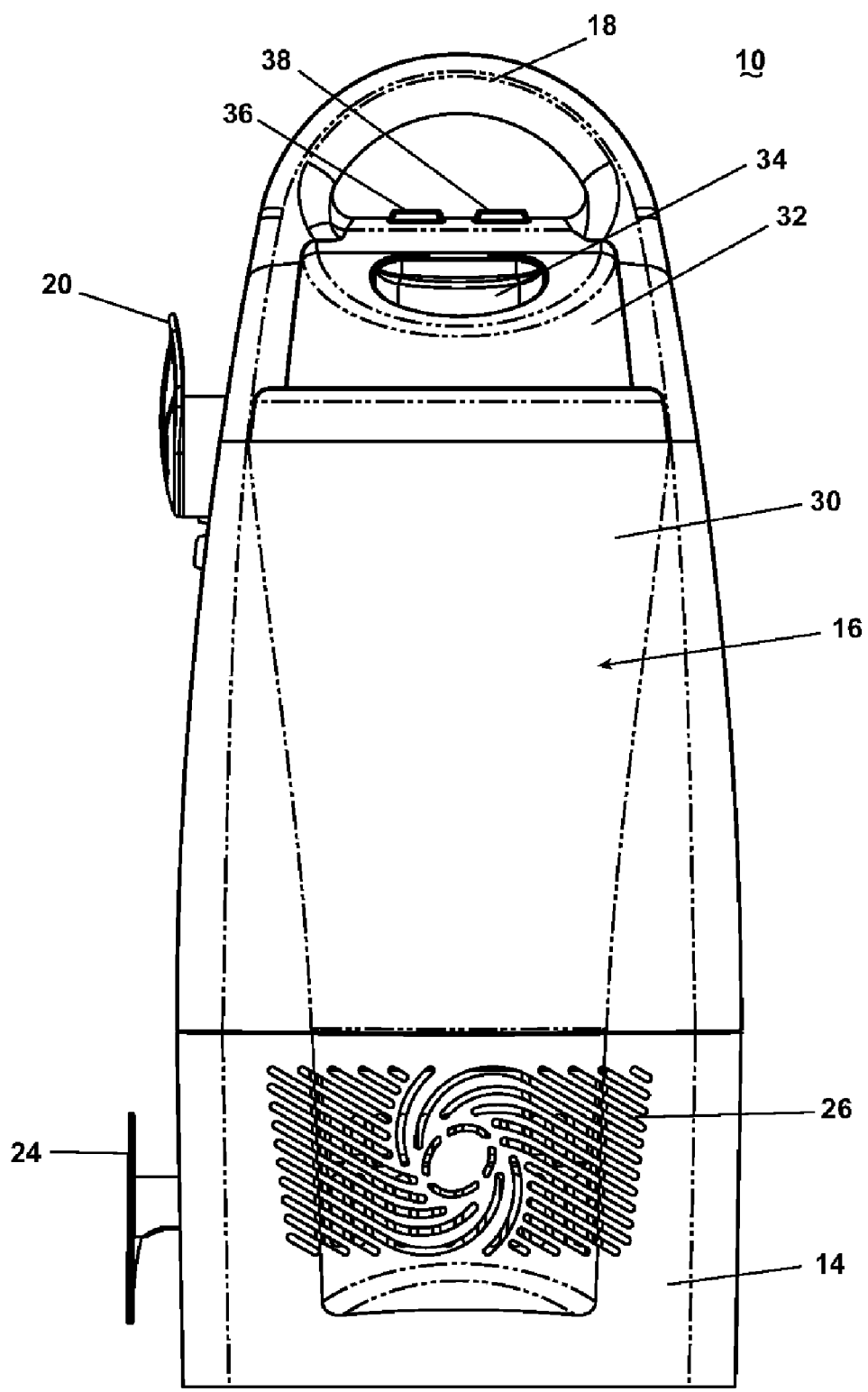
FIG. 1 is a front view of a suction cleaner housing with cyclonic dirt separation according to the invention.
Figure 2:
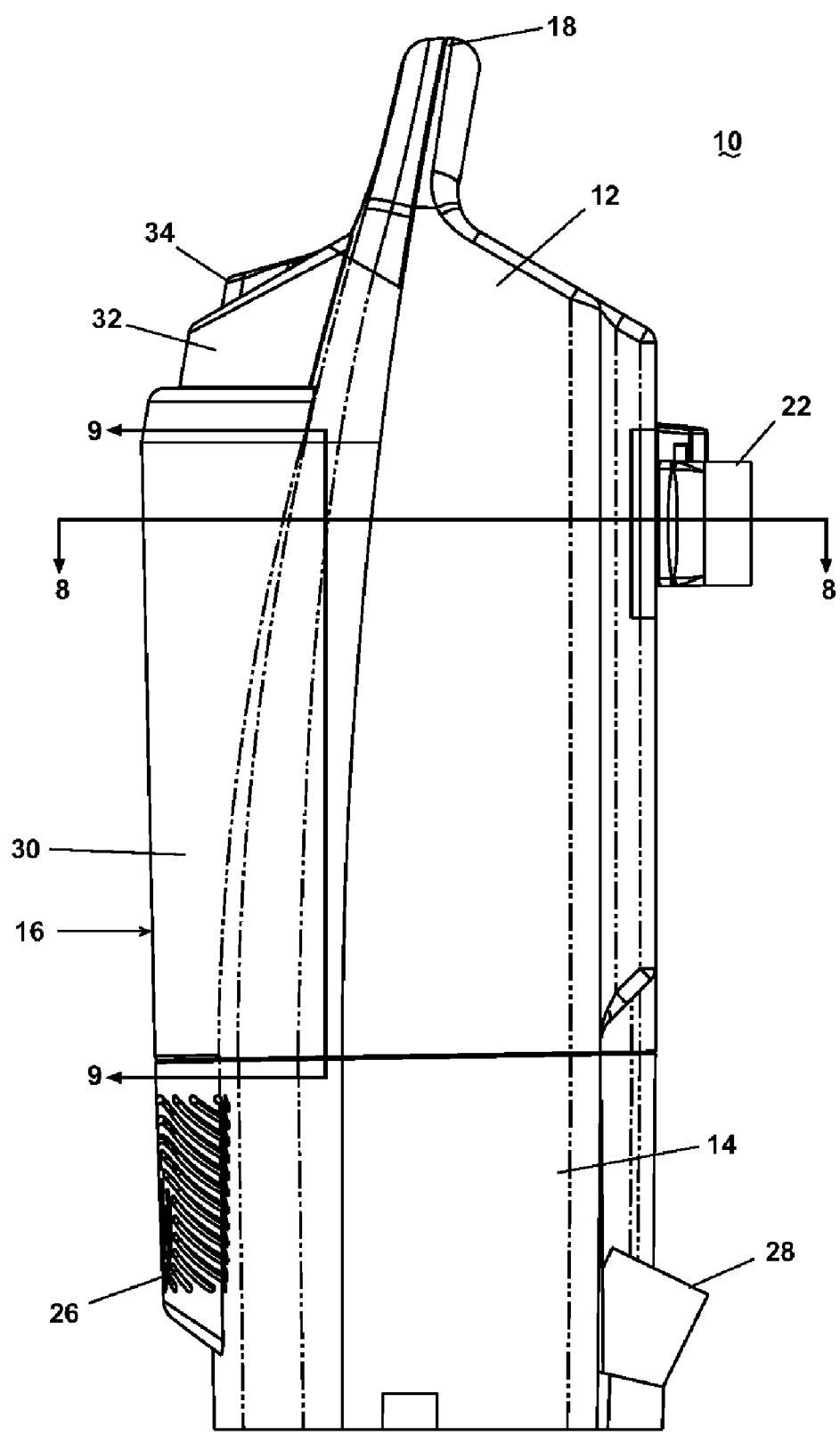
FIG. 2 is a side view of the suction cleaner of FIG. 1.
Figure 3:
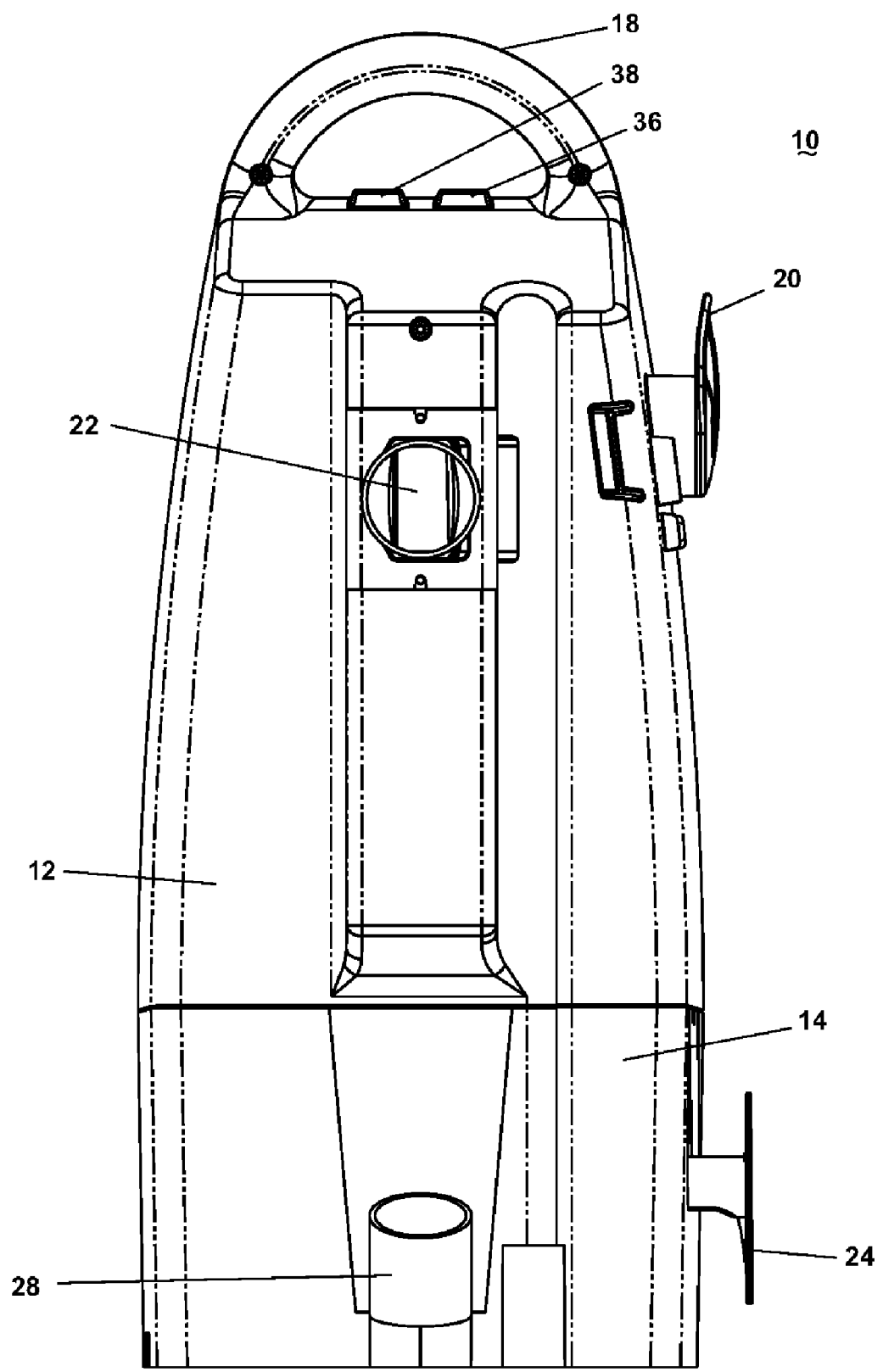
FIG. 3 is a rear view of the suction cleaner of FIGS. 1–2.

With reference to FIGS. 1–3, a vacuum cleaner module 10 comprises a module housing 12, a motor housing 14, and a dirt collection assembly 16. The module housing 12 includes a two-piece handle 18, an upper cord wrap 20, and an air inlet 22 conduit. The module housing 12 further includes first and second switches 36, 38. The motor housing 14 includes a lower cord wrap 24, an exhaust air vent 26 and a floor suction conduit 28. The dirt collection assembly 16 comprises a dirt separation housing 30, a housing cap 32, and a tank latch 34. Each of the dirt collection assembly 16, module housing 12, and motor housing 14 are configured to be assembled to present a smooth, continuous appearance, and to be generally fluid-tight.

Figure 4:
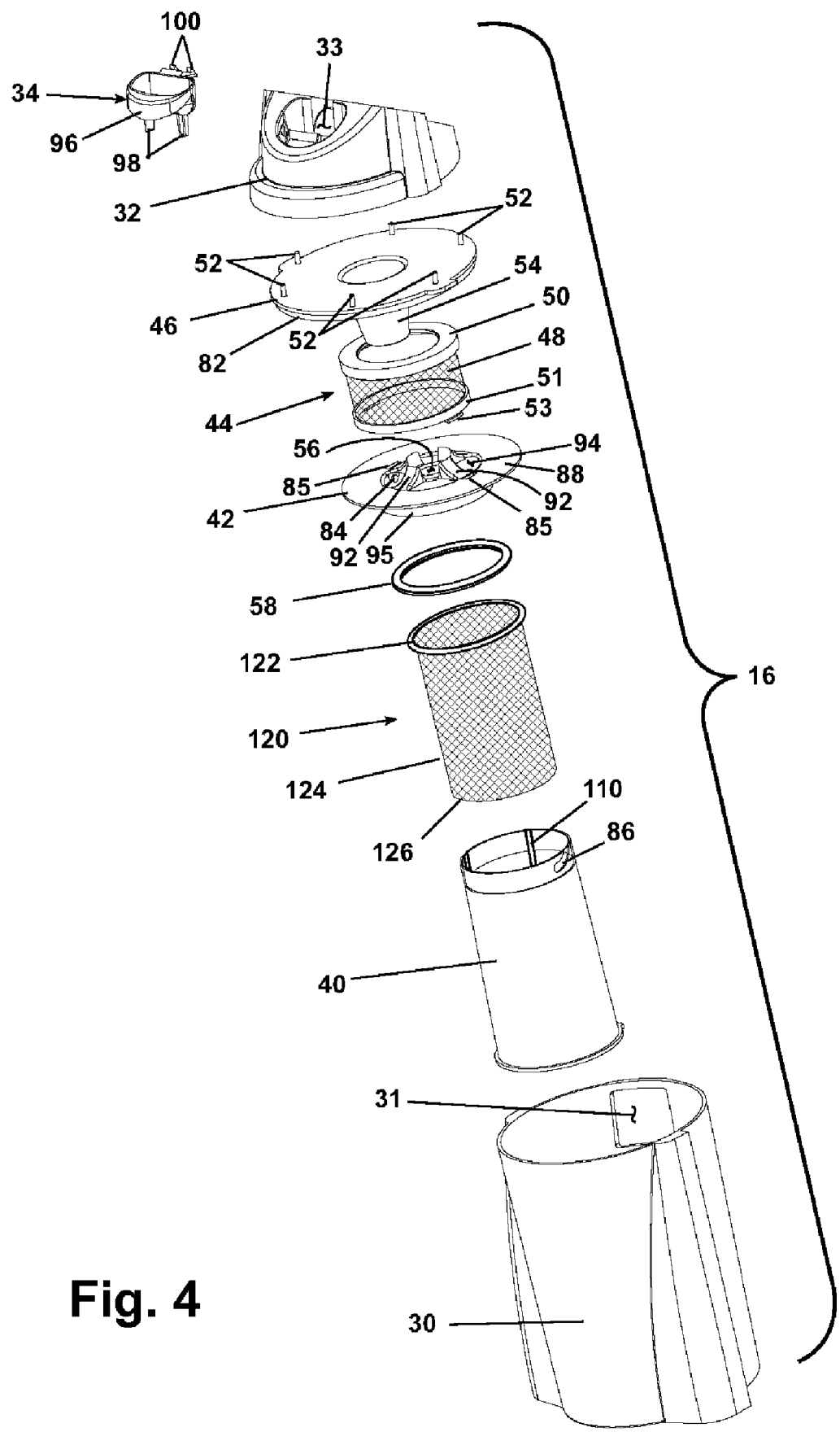
FIG. 4 is an exploded perspective view of a dirt collection assembly of the suction cleaner of FIGS. 1–3.

The dirt collection assembly 16, as shown in FIG. 4, includes the dirt-separation housing lower portion 30, the dirt separation housing upper portion 32 and the tank latch 34, and further includes a cylindrical separator 40, a secondary filter cup 120, a gasket 58, a separator plate 42, a cylindrical preliminary filter 44, and a top plate 46. Dirt-separation housing 30 includes an air inlet opening 31. Dirt separation housing upper portion 32 includes tank latch recess 33 for receiving tank latch 34. Tank latch 34 is an integral molding including a body portion 96, two generally downwardly depending leaf springs 98, and two rearwardly extending catches 100. Cylindrical separator 40 is a hollow cylinder and includes in its interior radially inwardly projecting ribs 110, and on its exterior twist-and-lock grooves 86. Secondary filter cup 120 includes an upper rim 122, cylindrical side wall 124, and bottom wall 126. Gasket 58 is annular and resilient for forming a compressive seal. Separator plate 42 is substantially annular, having an outer radial flange 88, and further including an inner portion having upwardly extending separator plate radial ribs 92 joined at a central hub and defining a central cavity 56, and separator plate apertures 94 defined radially between radial ribs 92. Separator plate 42 further includes filter alignment slots 85 adjacent radial ribs 92. Separator plate 42 further includes a depending skirt 95, skirt 95 having inwardly projecting tabs 84 for receipt in twist-and-lock grooves 86. Preliminary filter 44 includes a filter element 48 in the form of a fine mesh screen, and upper and lower filter frames 50, 51. Lower filter frame 51 includes alignment tabs 53 for receipt in alignment slots 85 of separator plate 42. Top plate 46 includes upwardly projecting studs 52 and a downwardly projecting frusto-conical portion 54. Filter element 48 has been found to be effective with a fine mesh having openings as small as 40 microns.

Figure 6:
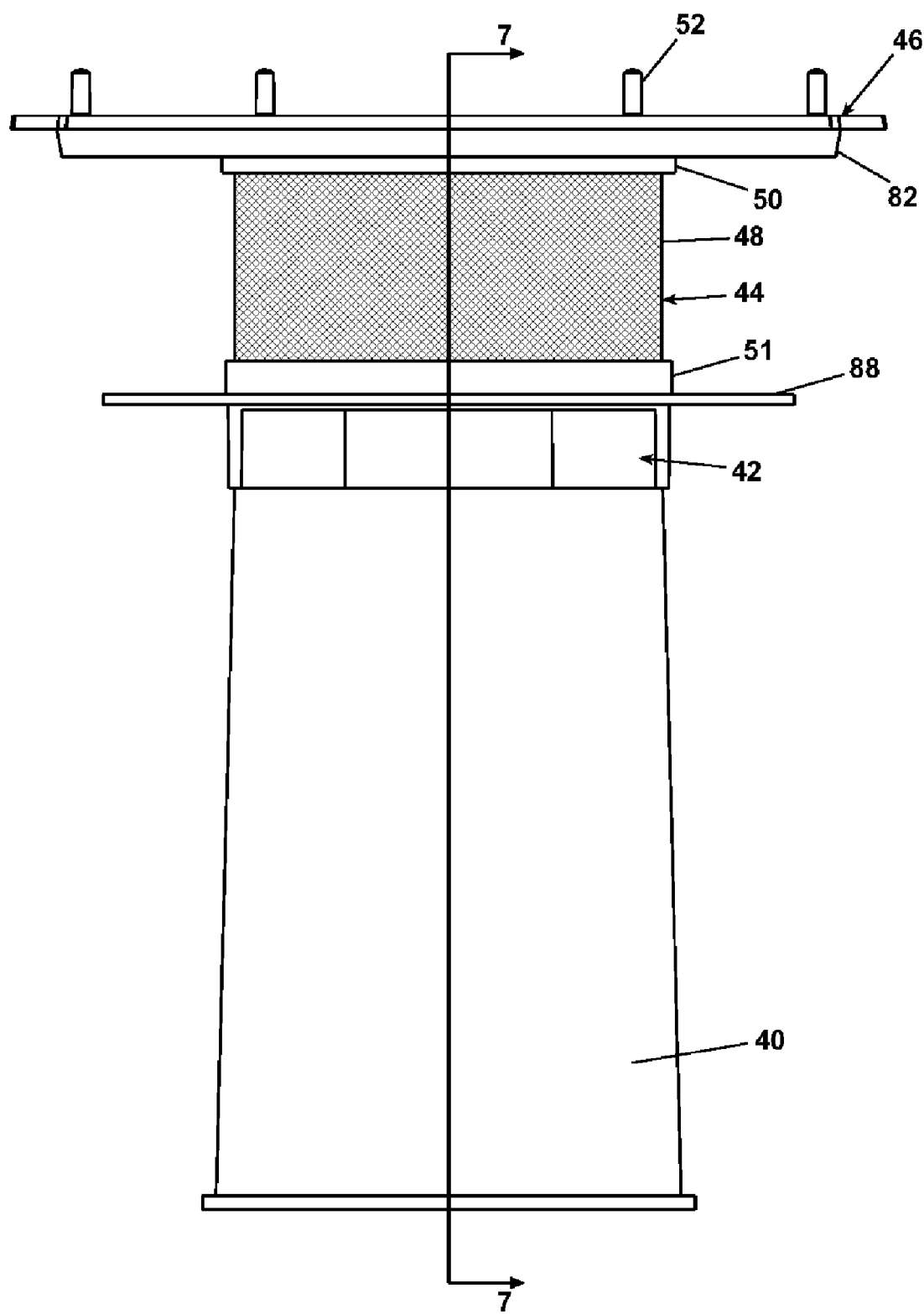
FIG. 6 is a front view of a cylindrical separator of the suction cleaner of FIGS. 1–5.
Figure 7:
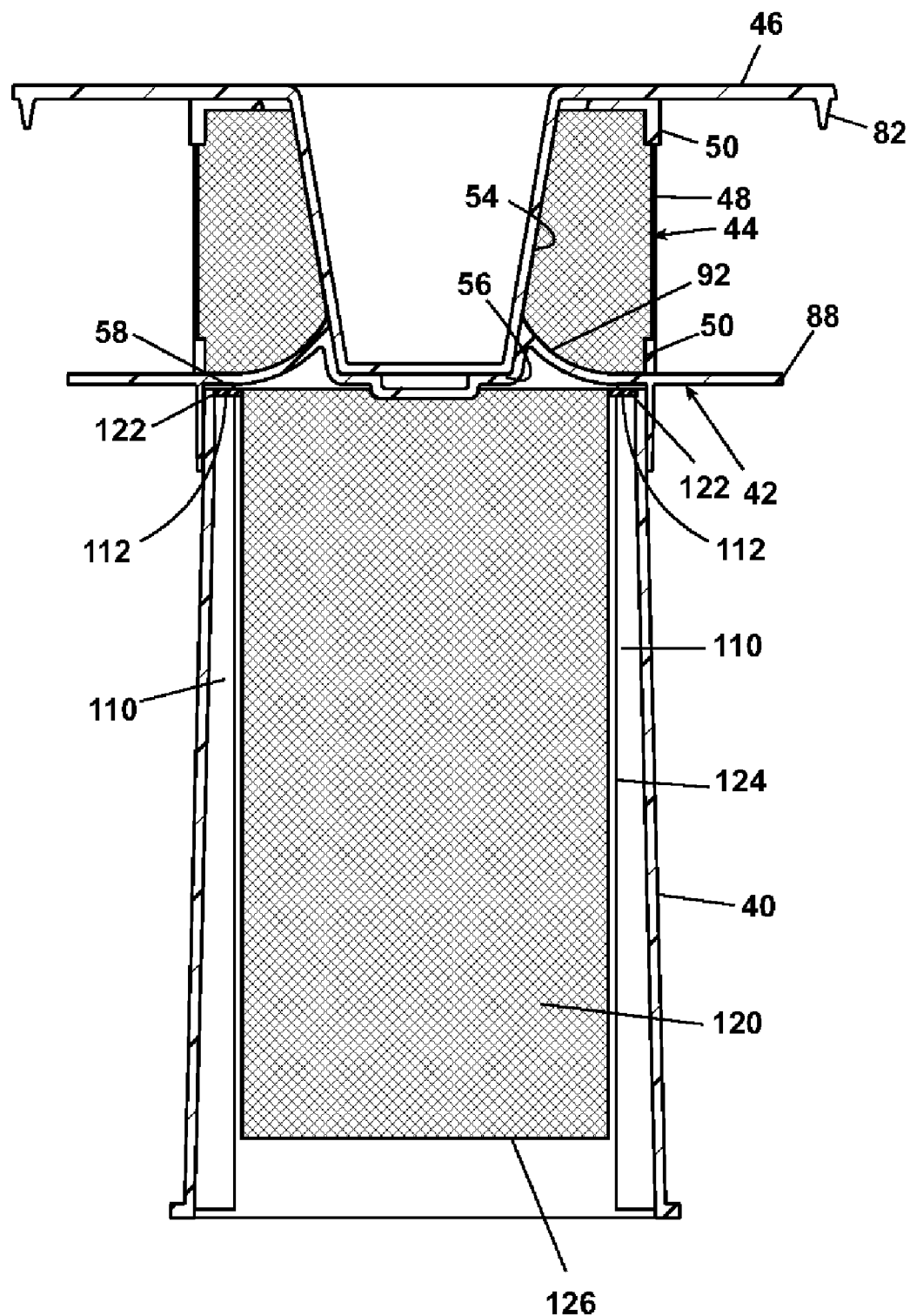
FIG. 7 is a cross-sectional view through line 7—7 of FIG. 6.

Referring now to FIGS. 6–7, ribs 110 of separator 40 each having an upper end 112 slightly recessed from the upper end of separator 40. Separator 40 receives cup 120 so that ribs 110 support rim 122, suspending cup 120 within separator 40, rim 122 being substantially flush with the upper end of separator 40. Separator plate 42, with gasket 58, is then received on separator 40 in a twist-and-lock arrangement using tabs 84 and grooves 86, creating a sealing arrangement between plate 42 and separator 40, and holding cup 120 in place against ribs 110. Prior to placement of plate 42 on separator 40, preliminary filter 44 is aligned on separator plate 42 using tabs and slots 53, 85, coaxial with cylindrical separator 40. Support element 54 is configured to fill central cavity 56 formed in the separator plate 42 to sandwich preliminary filter 44 therebetween. Preliminary filter 44 is thereby sealingly received between the top plate 46 and the separator plate 42 when the support element 54 of the top plate 46 is received in the central cavity 56 of the separator plate 42. The pins 52 projecting from the top plate 46 are received in recesses (not shown) on the underside of the housing cap 32 for holding and aligning the top plate 46 to the housing cap 32.

Figure 9:
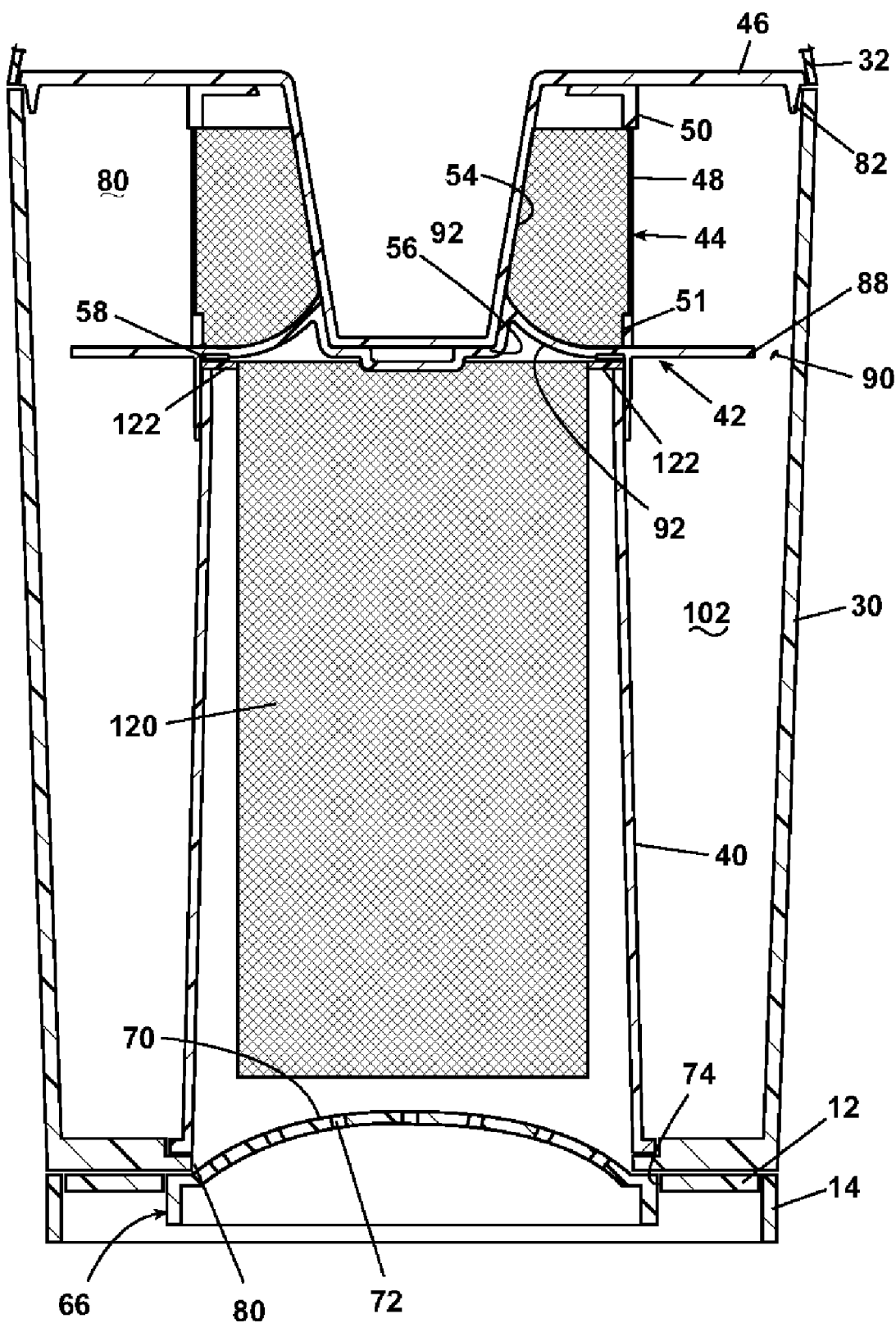
FIG. 9 is a cross-sectional view taken through line 9—9 of FIG. 2.

Referring again to FIG. 4, and to FIG. 9, the dirt collection assembly 16 comprises dirt-separation housing 30 having a generally cylindrical interior, and having a central aperture 76 on the bottom thereof. The cylindrical separator 40 is coaxially received within the dirt-separation housing 30, so that the open end of the hollow cylindrical separator 40 is aligned with and sealingly engages the perimeter of the central aperture 76 of the dirt-separation housing 30. The cylindrical separator 40 is preferably affixed to tank 30 at central aperture 76, such as by welding. The assembly comprising the housing cap 32, top plate 46, preliminary filter 44, and separator plate 42 are received within the upper end of dirt-separation housing 30 as separator plate 42 is received on the cylindrical separator 40 in the twist-and-lock arrangement of tabs and grooves 84, 86. The perimeter of the top plate 46 includes a canted lip 82 configured to fit inside the upper edge of the tank 30 in a sealing fit. The top plate 46 is fixed within the housing cap 32, so that when the top plate is fit within the top of the dirt-separation housing 30, the exterior of the housing cap 32 aligns with the exterior of the dirt-separation housing 30 to provide a uniform flush surface. The separator plate 42 includes a radial flange 88 having a diameter less than the interior diameter of the dirt-separation housing 30, resulting in an annular gap 90 between the separator plate 42 and the side walls of the dirt-separation housing 30.

Figure 5:
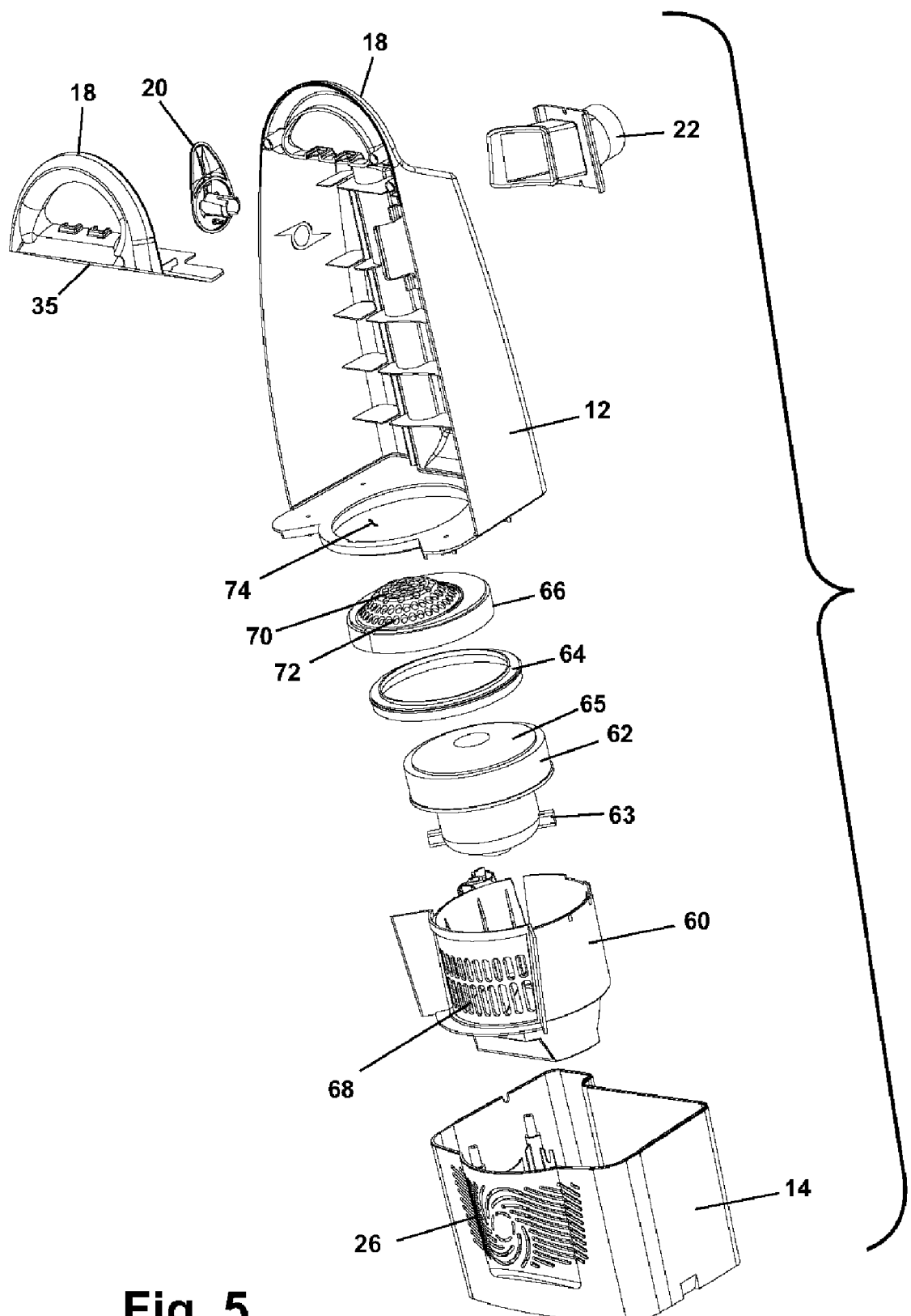
FIG. 5 is an exploded perspective view of a module housing and a motor housing of the suction cleaner of FIGS. 1–3.

The motor housing 14 having exhaust air vent 26, shown in FIG. 5, further comprises a motor cage housing 60 having exhaust vents 68, a motor/impeller assembly 62, an impeller gasket 64 and a motor cover 66. The motor/impeller assembly 62 includes motor brushes 63, impeller intake 65, and motor electrical connections (not shown). Motor/impeller assembly 62 is closely received within motor cage housing 60, motor cage housing 60 further comprising integral ribs (not shown) that cooperate with the exterior of motor/impeller assembly 62 in a nesting relationship. Motor cover 66 includes a raised intake port 70 having apertures 72. Gasket 64 is configured to create a fluid seal between motor cover 66 and motor/impeller assembly 62 so that impeller intake 65 is in sealed fluid communication with intake port 70. Motor cage housing 60 and motor cover 66 are configured to enclose motor/impeller assembly 62 and gasket 64, providing sealed fluid communication between the motor cover 66 and exhaust vents 68, through motor/impeller assembly 62. Motor housing 14 is configured to mate with the bottom of the module housing 12 so that the motor cover 66 sealingly fills central aperture 74, and the bottom of the module housing 12 sealingly covers the motor housing 14. Assembly of the motor cage housing 60 within the motor housing 14, and further assembly of the motor housing 14 to the module housing 12, therefore creates a sealed fluid path between the interior of the module housing 12 at apertures 72 of the motor cover 66, to exhaust outlet 26 of motor housing 14, through motor/impeller assembly 62.

Figure 8:
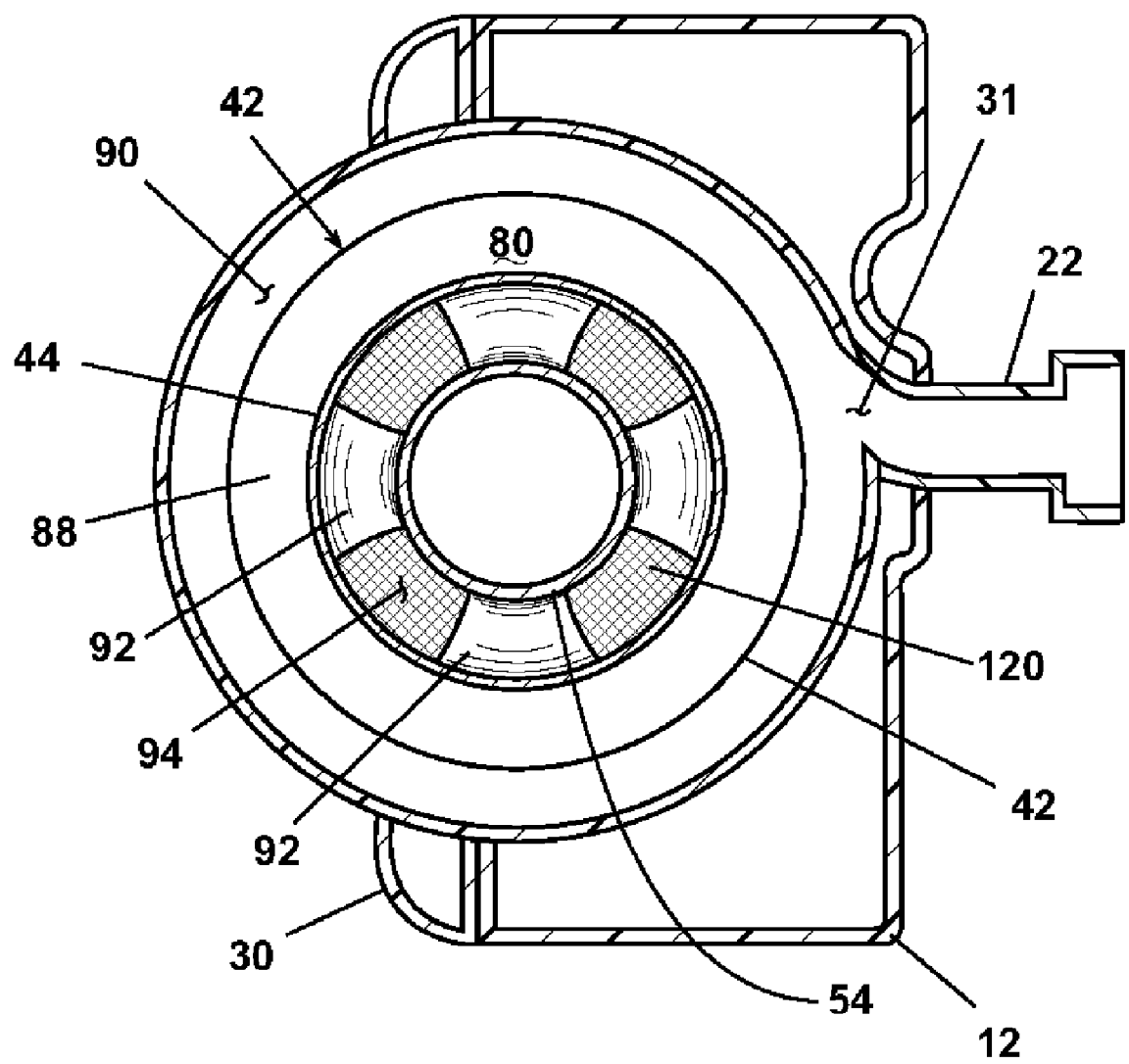
FIG. 8 is a cross-sectional view taken through line 8—8 of FIG. 2.
Figure 10:
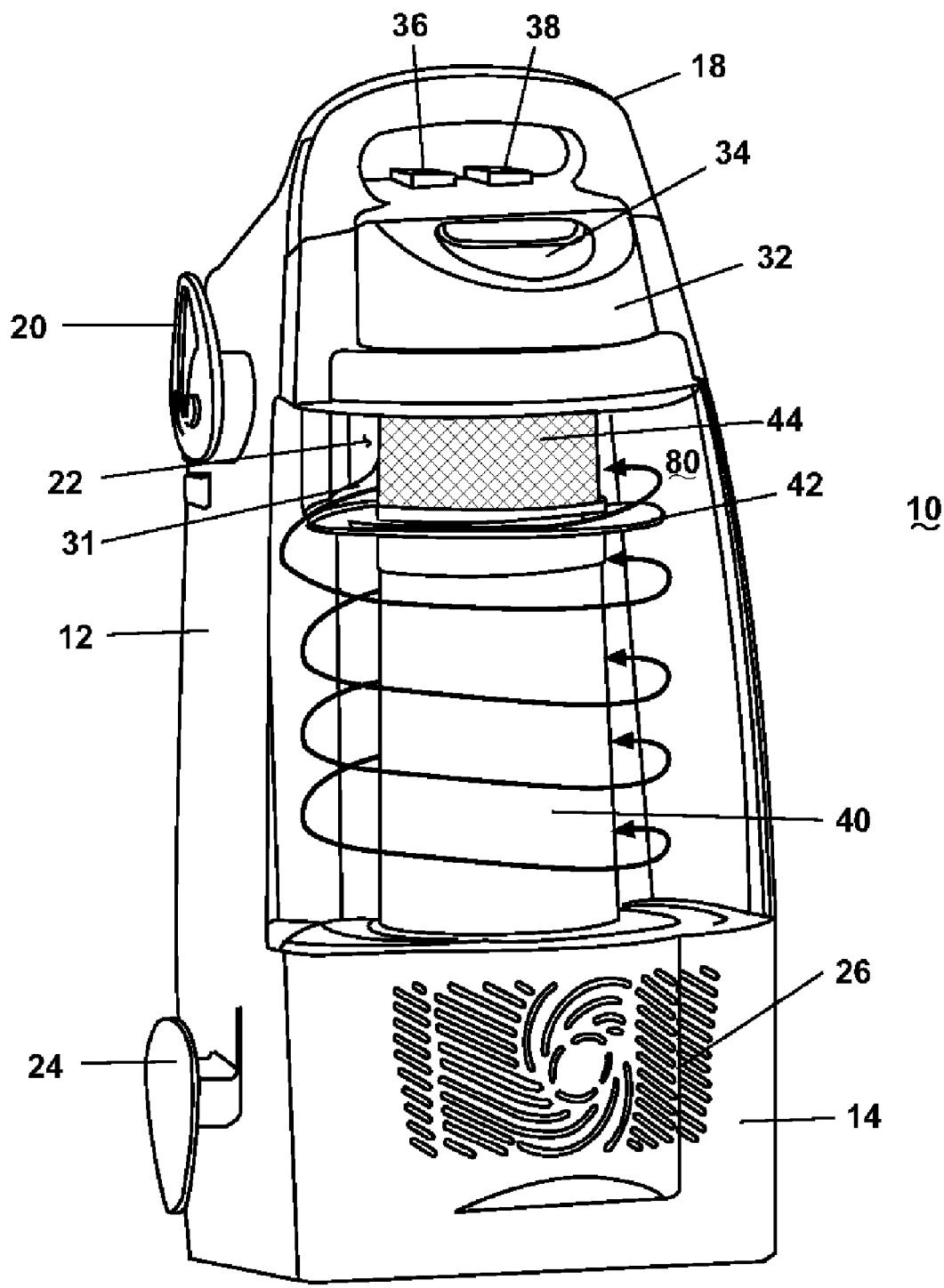
FIG. 10 is a cut-away perspective view of the suction cleaner of FIGS. 1–9 showing air flow around the cylindrical separator in the dirt collection assembly.

Referring now to FIGS. 8–11, the dirt collection assembly 16 can be assembled and inserted into the module housing 12 so that the cylindrical separator 40 within the tank 30 is aligned with and fluidly connected with the motor cover 66, and the inlet aperture 31 of the dirt-separation housing 30 is further fluidly connected with the air inlet 22, as particularly shown in FIGS. 8 and 10. Dirt collection assembly 16 is held in module housing 12 by tank latch 34 as will be further described below. The air inlet 22 is therefore fluidly connected to the exhaust air vent 26 of the motor housing 14 through the inlet opening 31 of the dirt-separation housing 30, the preliminary filter element 44, the separator plate 42, the hollow cylindrical separator 40, the apertures 72 of the raised portion 70 of the motor cover 66, the motor impeller assembly 62, and the exhaust vent 68 of the motor cage housing 60.

The user controls the suction cleaner by activating one of the switches 36, 38 to supply power to the motor impeller assembly 62. When the motor impeller assembly 62 is activated, a suction force is generated at the motor cover 66, causing a flow of air from the motor cover 66 through the motor impeller assembly 62, motor cage housing 60 and into the motor housing 14, and then to atmosphere through the exhaust air vent 26. A post-motor filter (not shown) is configured to fully occupy, and is inserted in, the space between exhaust vents 68 and exhaust air vent 26. When the motor cover 66 is sealingly and fluidly connected to the cylindrical separator 30, as in when the dirt collection assembly 16 is fully installed in the module housing 12, the motor/impeller assembly 62 is an airstream suction source that is fluidly connected to the cyclonic chamber inlet opening 22 through the cyclonic airflow chamber 80, filter 44, filter 120 and outlet openings 72 to establish and maintain a tangential flow of dirt-containing airstream within the cyclone airflow chamber 80 as the airstream flows between the cyclonic chamber inlet opening 31 and the airstream outlet opening 72 for separating dirt from the airstream in the cyclonic chamber 80. A suction hose or nozzle of known construction is generally attached to the air inlet 22 for use in cleaning a surface.

As air is drawn into the air inlet 22, the air inlet 22 imparts a tangential component to the inlet air, as shown in FIG. 10, as it enters the dirt-separation housing 30 through the aperture 31. The air enters the dirt-separation housing 30 in a toroidal section of the dirt tank formed between top plate 46 and separator plate 42, and between the preliminary filter 44 and the interior tank wall. As the air flows in a tangential direction about the dirt-separation housing 30, heavier particles of dirt and debris are propelled outwardly by centrifugal force and fall under the force of gravity through the gap 90 formed between the radial flange 88 of the separator plate 42 and the dirt-separation housing 30 into a dirt collecting chamber 102 in the lower portion of the dirt-separation housing 30. It has been found that separator plate 42 acts as a separator between two air velocity zones, one existing in the toroidal cyclonic airflow chamber 80 having a relatively high rotational air velocity, and a second zone in the dirt collecting chamber 102 separated from the toroidal cyclonic airflow chamber 80, below separator plate 42, having a much lower rotational air velocity. The high rotational air velocity in the toroidal cyclonic airflow chamber 80 forces dirt particles contained in the airstream to the outside of the chamber where they will be drawn through the gap 90 to the outside of flange 88. As the airstream flows into the zone beneath the separator plate 42 and the air velocity decreases, the dirt particles will fall out of the airstream and collect and the dirt-separation housing 30. It has been found that narrowing the gap 90, in the sense of having a high ratio of the surface area of the plate 42 to the overall cross-sectional area of the housing, is beneficial to maintaining the two air velocity zones. This must be balanced with maintaining a gap 90 large enough to enable passage of larger dirt particles such as hair, carpet fuzz, etc. A relative plate surface area in the range of 0.75 to 0.95 with respect to the housing cross-sectional area is effective in defining the two air velocity zones while enabling the passage of large dirt particles, with the preferred ratio of surface areas being 0.8 to 0.92, or optimally 0.9.

Figure 11:
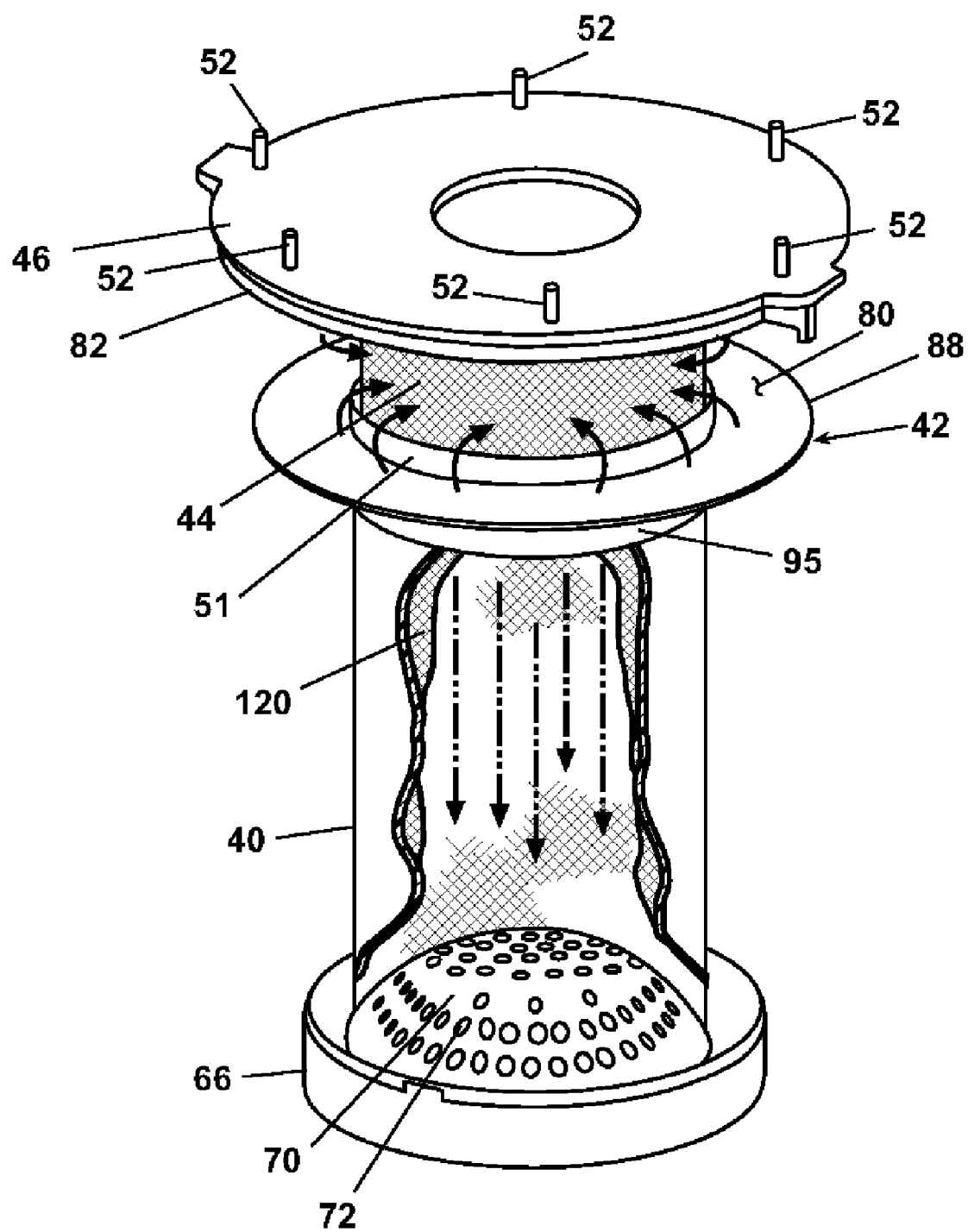
FIG. 11 is a cut-away perspective view of the cylindrical separator of FIGS. 1–10 showing an internal axial air flow.

The air flow circulates tangentially about the interior of the tank 30 until it is drawn inwardly toward the preliminary filter element 44, as shown in FIG. 11. As the air flow passes through the preliminary filter element 44, the filter element 44 prevents larger dirt particles and debris, that did not fall to the lower portion of the dirt-separation housing 30, from passing into the interior of filter element 44 and then into the interior of separator 40 and filter cup 120. The air is then drawn downwardly between separator plate radials 92 through separator plate apertures 94 (see FIG. 8), through filter cup 120 which traps additional finer particles, and passes axially through the hollow interior of the cylindrical separator 40, then through apertures 72 and the motor housing 14 to atmosphere through the post motor filter (not shown) and the exhaust air vent 26.

Dirt and debris, when collected in the dirt-separation housing 30, can be discarded by removing the dirt collection assembly 16 from the module housing 12. Dirt collection assembly 16 is retained in module housing 12, as stated above, by tank latch 34 on housing cap 32. Leaf springs 98 bias latch 34 upwardly by pressing against the bottom of recess 33, forcing the catches 100 underneath a lip 35 of the handle 18, thereby retaining the housing cap 32 against the handle 18. Latch 34 is released by depressing the latch body 96 against the biasing force of the leaf springs 98, thereby releasing the catches 100 from the lip 35. The dirt collection assembly 16 can then be tilted away from the housing portion 12. With the dirt collection assembly 16 removed from the module housing 12, the assembly comprising housing cap 32, top plate 46, preliminary filter 44 and separator plate 42, can be removed from dirt-separation housing 30 and cylindrical separator 40 as a unit by counter-clockwise rotation of the twist-and-lock arrangement of tabs and grooves 84, 86. The upper portion of the dirt-separation housing 30 and the filter cup 120 are thus open so that they can be emptied by a user. Filter cup 120 can further be removed from separator 40 for cleaning, and top plate 46 can be further separated from the separator plate 42 for cleaning or replacement of the preliminary filter assembly 44. Upon reassembly as described above, dirt collection assembly 16 is replaced in module housing 12 by inserting the lower portion of the assembly 16 into the housing portion 12 and tilting it inwardly until catches 100 resiliently slide past lip 35 to bias upwardly and engage lip 35 and hold assembly 16 in place in module housing 12.

Figure 12:
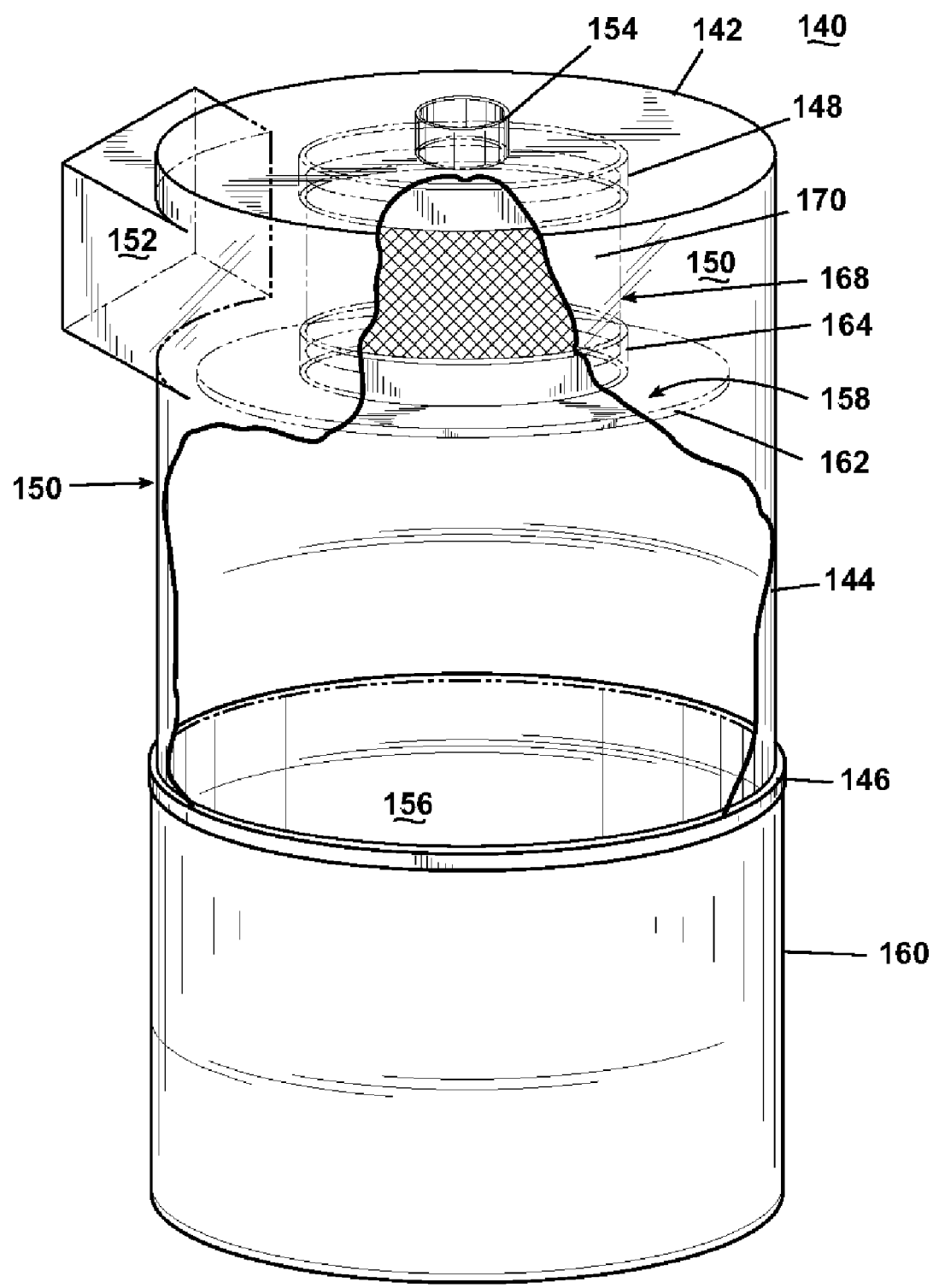
FIG. 12 is a cut-away perspective view of a further embodiment of a cyclonic separator for a suction cleaner according to the invention.

Referring to FIG. 12, a further embodiment of a cyclonic dirt separator 140 according to the invention comprises a cylindrical cyclone chamber 150 having an upper wall 142 and a sidewall 144, the sidewall 144 terminating in a lower offset lip 146. An annular collar 148 depends from upper wall 142, the collar 148 being centered in the cylindrical chamber 150. An exhaust outlet 154 in the upper wall 142 and within the annular collar 148 is fluidly connected with a suction source (see FIG. 14). Sidewall 144 further includes a tangential air inlet 152 aligned proximate the upper wall 142 for generating a tangential airflow in the chamber 150 parallel to the upper wall 142.

The cyclonic dirt separator 140 further comprises a primary filter element 168. In a preferred embodiment, the primary filter element 168 comprises a cylindrical fine mesh screen 170 retained by the collar 148 that depends from upper wall 142 of the chamber 150. Cyclonic dirt separator 140 further comprises a separator plate 158 in the form of a solid disc having an upstanding annular collar 164. In the preferred embodiment, the upstanding annular collar 164 is aligned with the depending collar 148 of the upper wall 142 so that the cylindrical screen 170 is retained at the ends thereof by each of the collars 148, 164. In this manner, separator plate 158 is suspended from upper wall 142, forming a toroidal cyclonic airflow chamber 150 between the cylindrical screen 170 and the sidewall 144, and between the upper wall 142 and the separator plate 158, respectively. In the preferred embodiment, air inlet 152 is vertically aligned between upper wall 142 and separator plate 158 such that the tangential airflow generated from tangential air inlet 152 is directed into the toroidal cyclonic airflow chamber 150.

Figure 13:
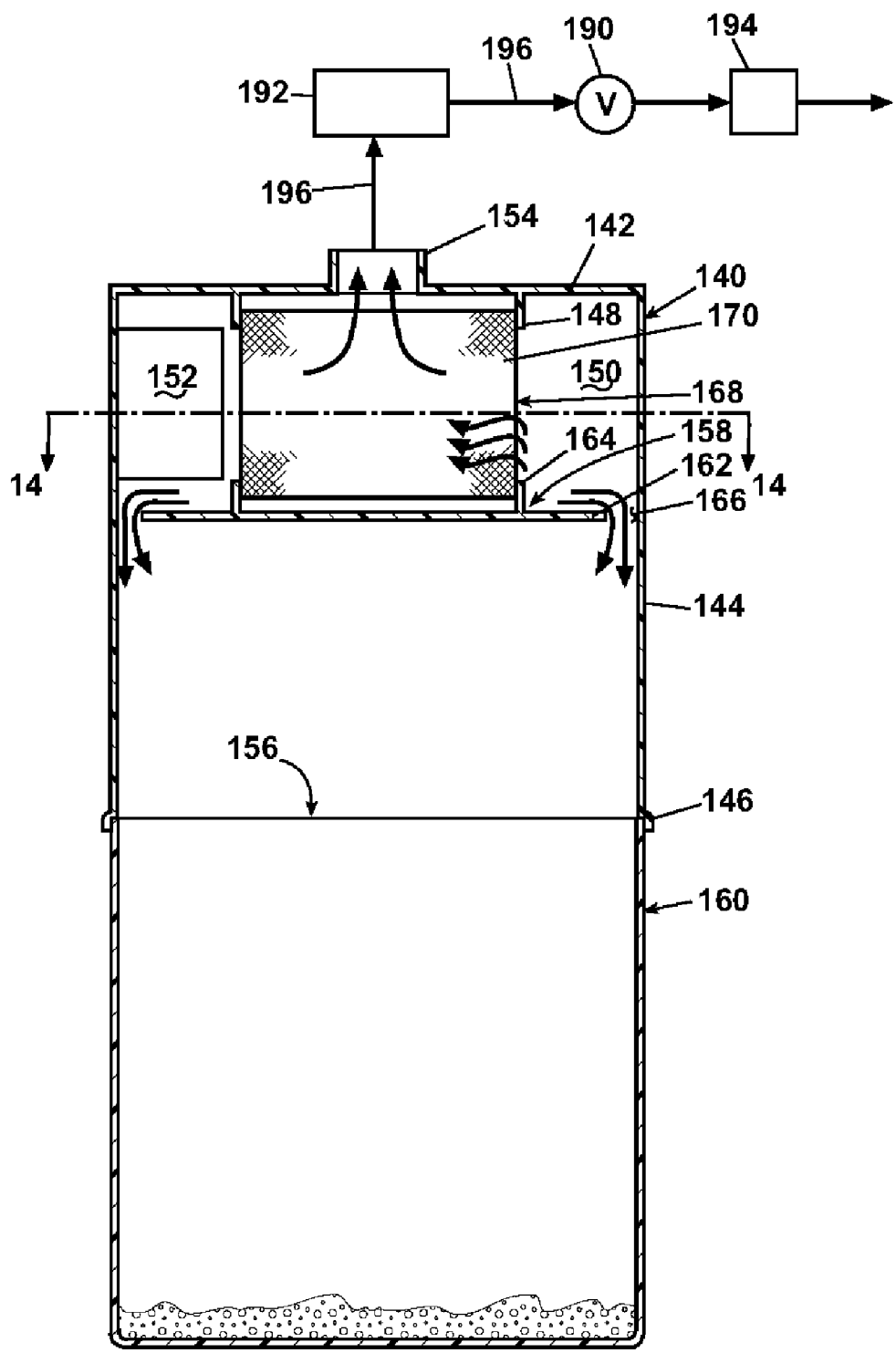
FIG. 13 is a front cross-sectional view of the cyclonic separator of FIG. 12.
Figure 14:
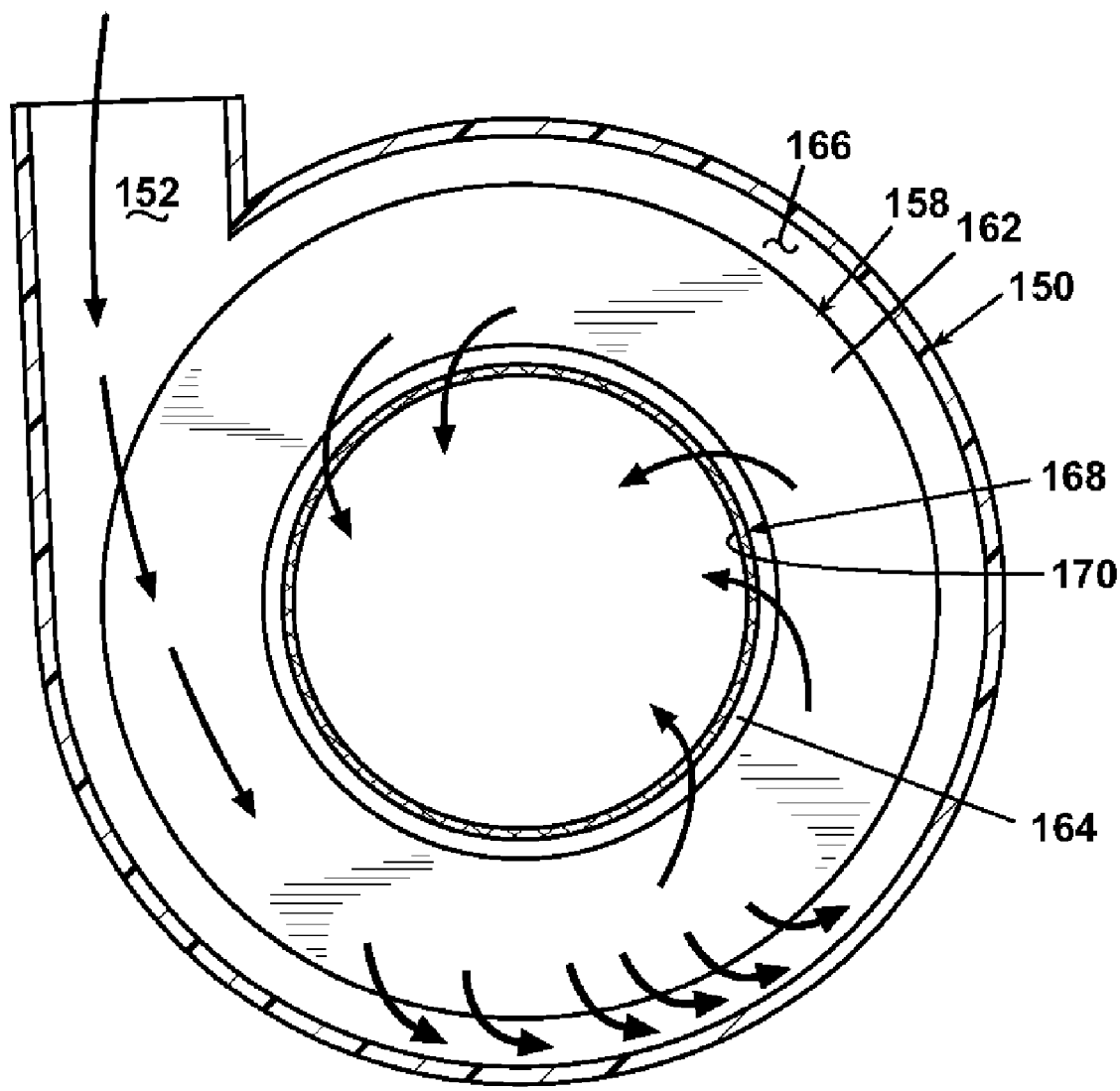
FIG. 14 is a cross-sectional view taken through line 14—14 of FIG. 13.

With further reference to FIGS. 13–14, the tangential airflow, containing particulate matter, passes through tangential air inlet 152 and into toroidal cyclonic airflow chamber 150 to travel around the cylindrical screen 170. As the air travels about the toroidal cyclonic airflow chamber 150, heavier dirt particles are forced toward sidewall 144. These particles will fall under the force of gravity through a gap 166 defined between an edge 162 of separator plate 158 and the sidewall 144. Referring particularly to FIG. 13, dirt particles falling through the gap 166 drop through the open end 156 of chamber 150 and are collected in the dirt cup 160. The upper end of dirt cup 160 is received in a nesting relationship in lower offset lip 146 of the sidewall 144 to seal the cyclone chamber 150 to the dirt cup 160.

As the inlet air traverses through toroidal cyclonic airflow chamber 150, casting dirt particles toward sidewall 144, the inlet air will be drawn through cylindrical screen 170, through exhaust outlet 154, exhaust/suction conduit 196, through a secondary (pre-motor) filter 192 to the suction source 190. The secondary filter 192 removes additional particulate matter from the exhaust airstreams prior to the airstreams being drawn through the suction source 190. A post-motor filter 194 can also be provided downstream of the suction source 190 to remove additional fine particulate matter from the exhaust airstream before it is released to the atmosphere.

Dirt cup 160 is removably connected to chamber 150. Accumulated dirt can be discarded by axially displacing dirt cup 160 from cyclone chamber 150 so that it disengages from offset lip 146. Dirt cup 160 can then be removed from chamber 150 to discard accumulated dirt.

Figure 13A:
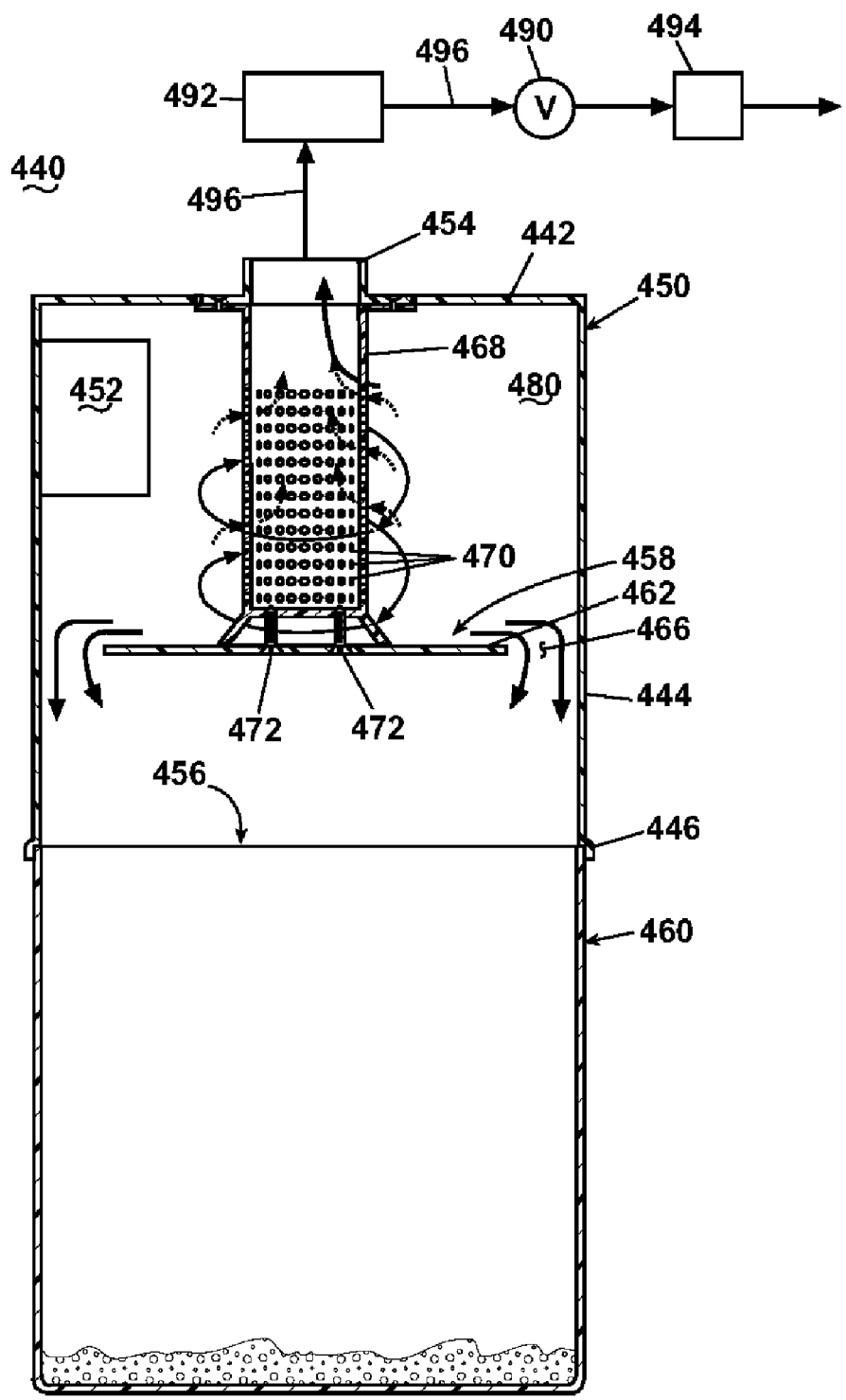
FIG. 13A is a front cross-sectional view of a further embodiment of a cyclonic separator according to the invention.

A further embodiment of a cyclonic separator 440 is shown in FIG. 13A. the cyclonic separator 440 comprises a cylindrical cyclone chamber 450 having an upper wall 442 and a sidewall 444, the sidewall 444 terminating in a lower offset lip 446. A substantially cylindrical filter assembly 468 depends from upper wall 442, being centered in the cylindrical chamber 450. An exhaust outlet 454 in the upper wall 442 and within the filter assembly 468 is fluidly connected with a suction source 490. Sidewall 444 further includes a tangential air inlet 452 aligned proximate the upper wall 442 for generating a tangential airflow in the chamber 450 parallel to the upper wall 442.

In a preferred embodiment, the filter assembly 468 comprises a plurality of apertures 470 passing through the wall of the assembly 468 and fluidly connecting air inlet 452 with exhaust outlet 454. Cyclonic dirt separator 440 further comprises a separator plate 458 in the form of a solid disc. Separator plate 458 is secured by fasteners 472 to a lower end of cylindrical filter assembly 468, parallel to upper wall 442, forming a toroidal cyclonic airflow chamber 480 between the cylindrical filter assembly 468 and the sidewall 444, and between the upper wall 442 and the separator plate 458, respectively. In the preferred embodiment, air inlet 452 is vertically aligned between upper wall 442 and separator plate 458 such that the tangential airflow generated from tangential air inlet 452 is directed into the toroidal cyclonic airflow chamber 480.

As in the previous embodiment, the tangential airflow, containing particulate matter, passes through tangential air inlet 452 and into toroidal cyclonic airflow chamber 480 to travel around the cylindrical filter assembly 468. As the air travels about the toroidal cyclonic airflow chamber 480, heavier dirt particles are forced toward sidewall 444. These particles will fall under the force of gravity through a gap 466 defined between an edge 462 of separator plate 458 and the sidewall 444. Dirt particles falling through the gap 466 drop through the open end 456 of chamber 450 and are collected in the dirt cup 460. The upper end of dirt cup 460 is received in a nesting relationship in lower offset lip 446 of the sidewall 444 to seal the cyclone chamber 450 to the dirt cup 460.

As the inlet air traverses through toroidal cyclonic airflow chamber 480, casting dirt particles toward sidewall 444, the inlet air will be drawn through the apertures 470 in cylindrical filter assembly 468, through exhaust outlet 454, exhaust/suction conduit 496, through a secondary (pre-motor) filter 492 to the suction source 490. The secondary filter 492 removes additional particulate matter from the exhaust airstreams prior to the airstreams being drawn through the suction source 490. A post-motor filter 494 can also be provided downstream of the suction source 490 to remove additional fine particulate matter from the exhaust airstream before it is released to the atmosphere.

Dirt cup 460 is removably connected to chamber 450. Accumulated dirt can be discarded by axially displacing dirt cup 460 from cyclone chamber 450 so that it disengages from offset lip 446. Dirt cup 460 can then be removed from chamber 450 to discard accumulated dirt.

Figure 13B:
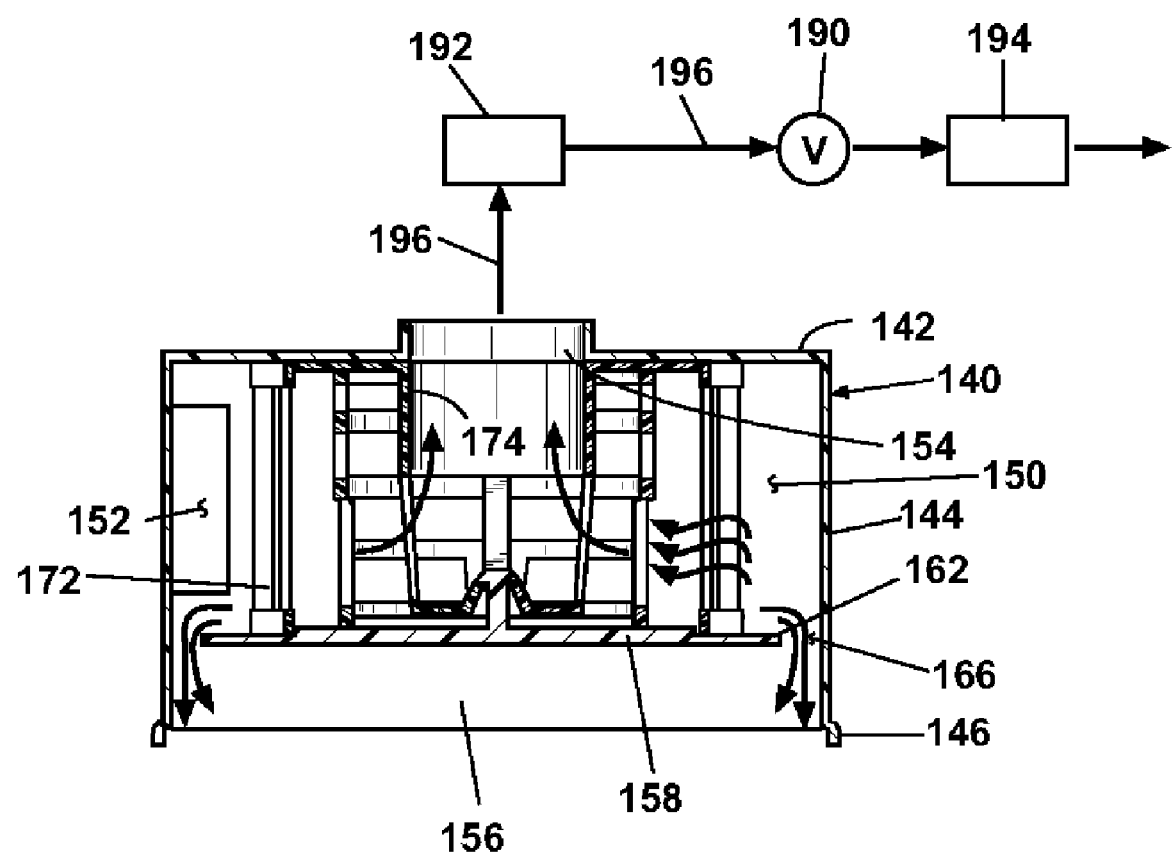
FIG. 13B is a front cross-sectional view, like FIG. 13A of a further embodiment of a cyclonic separator according to the invention.

Referring now to FIG. 13B, where like numerals have been used to designate like parts, a dirt separator 140 has a tangential inlet opening 152 in an upper portion of the cylindrical wall 144 and a central outlet opening 154 extending through the upper wall 142 thereof. An annular array of louvers 172 is mounted centrally within the dirt separator 140 and defines a cyclone separation chamber 150 with the cylindrical wall 144 of the dirt separator 140. A cylindrical wall 174 extends downwardly from the upper wall 142 from the central outlet opening 154 to define an outlet passage within the cylindrical space of the louvers 172. A cylindrical separator plate 158 is removably mounted to the annular wall 174 beneath the louvers 172 and separates the dirt separator 140 from the dirt collector 160 (FIG. 13).

Figure 15:
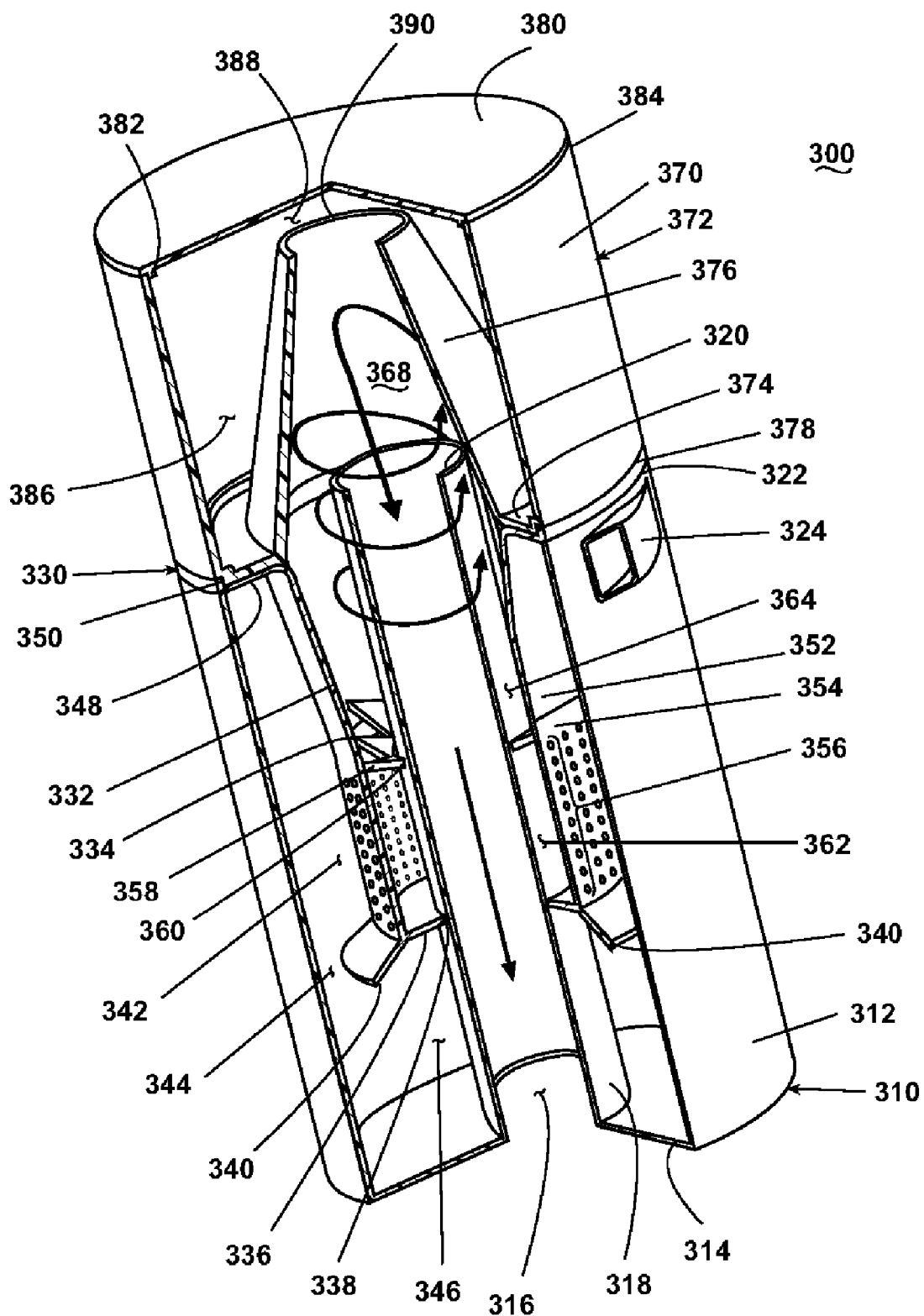
FIG. 15 is a cut-away perspective view of a further embodiment of a dirt collection assembly with cyclonic dirt separation according to the invention.
Figure 15A:
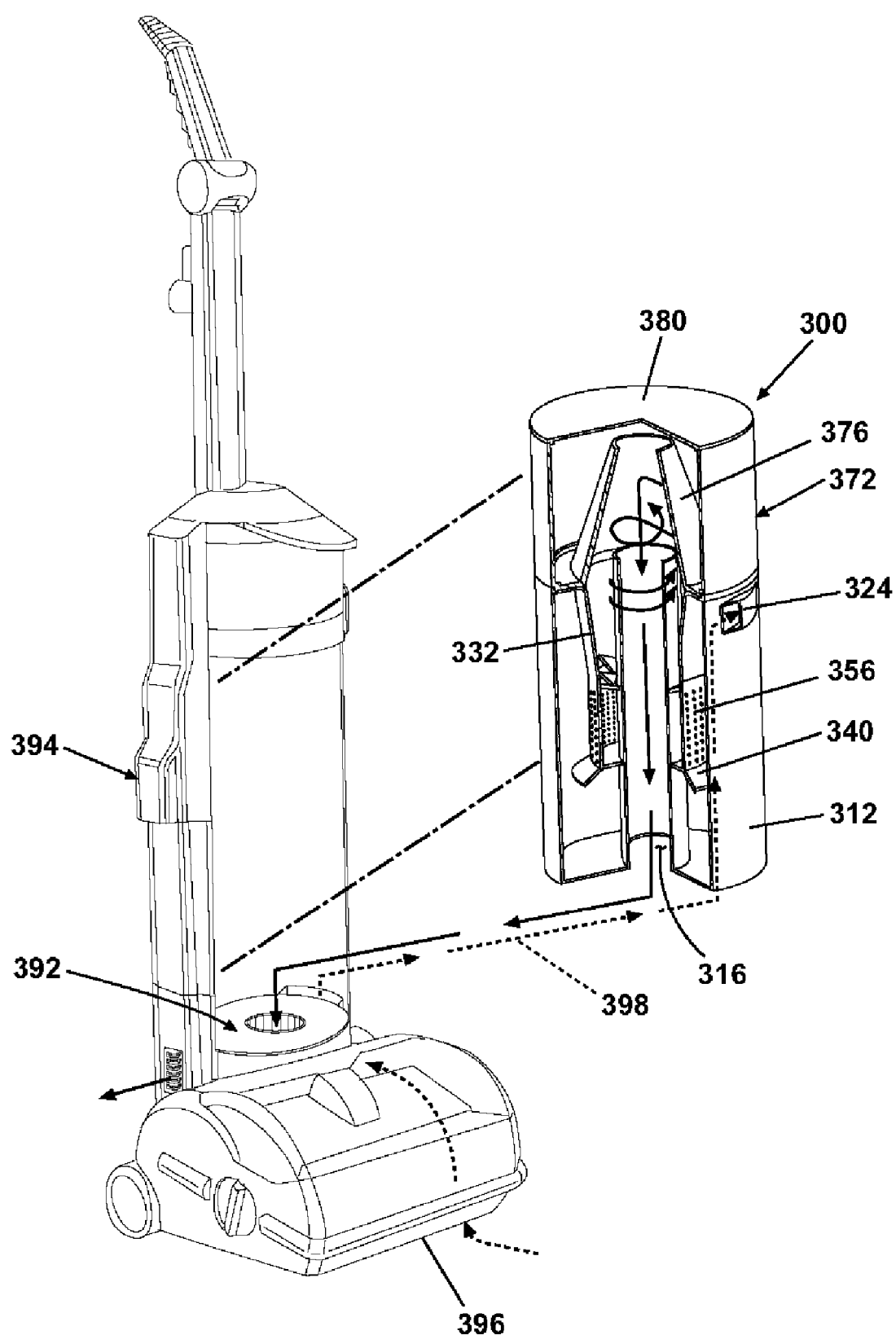
FIG. 15A is a schematic illustration of the dirt collection assembly of FIG. 15 with a conventional vacuum cleaner.
Figure 16:
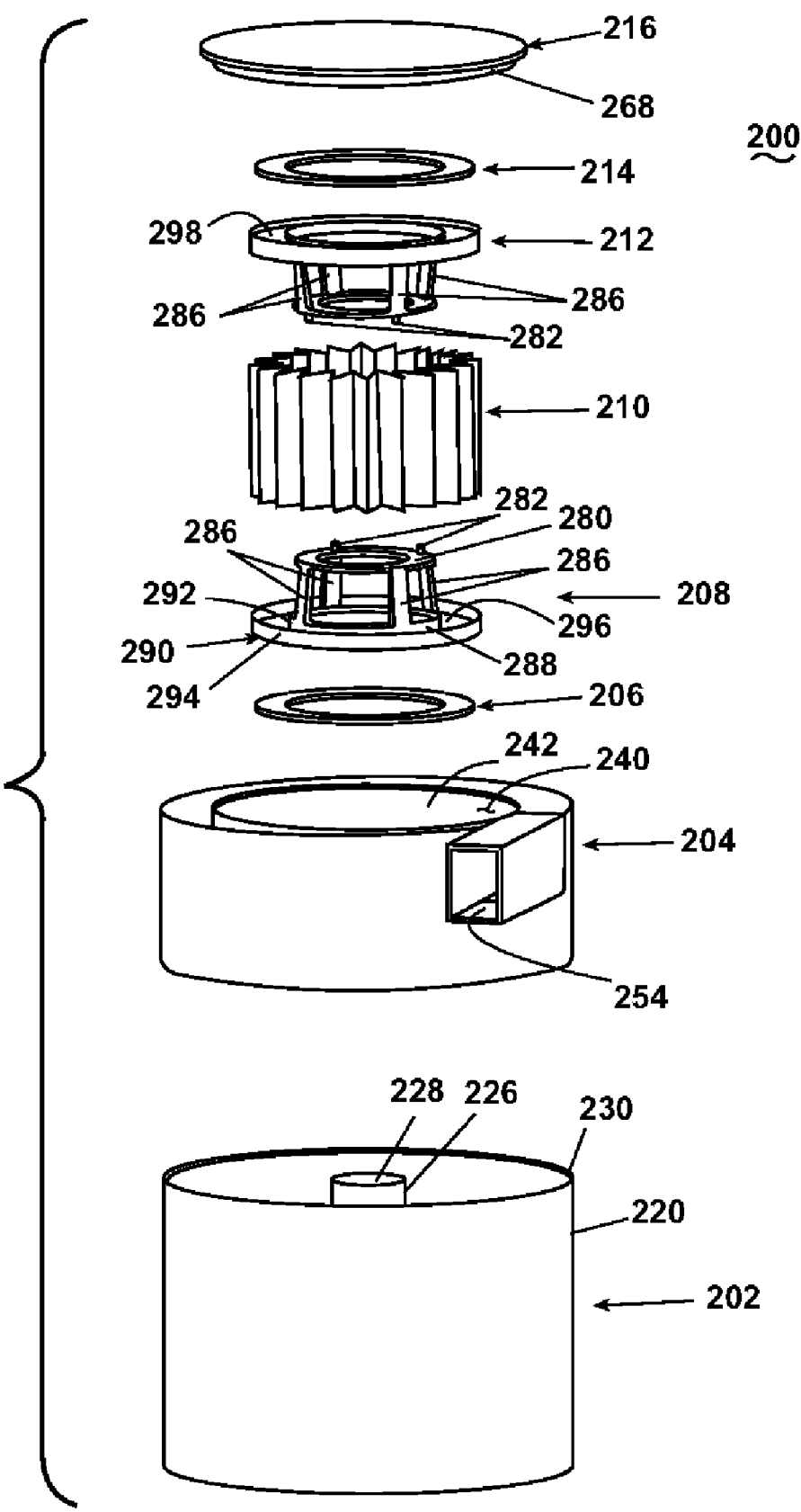
FIG. 16 is an exploded perspective view of another embodiment of a dirt collection assembly with cyclonic dirt separation according to the invention.
Figure 17:
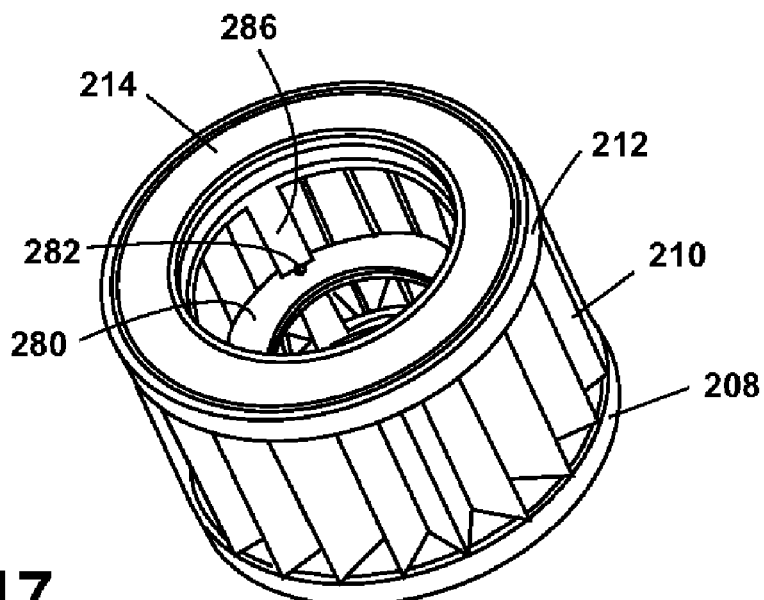
FIG. 17 is an enlarged perspective view of a filter assembly for the dirt collection assembly of FIG. 16.
Figure 18:
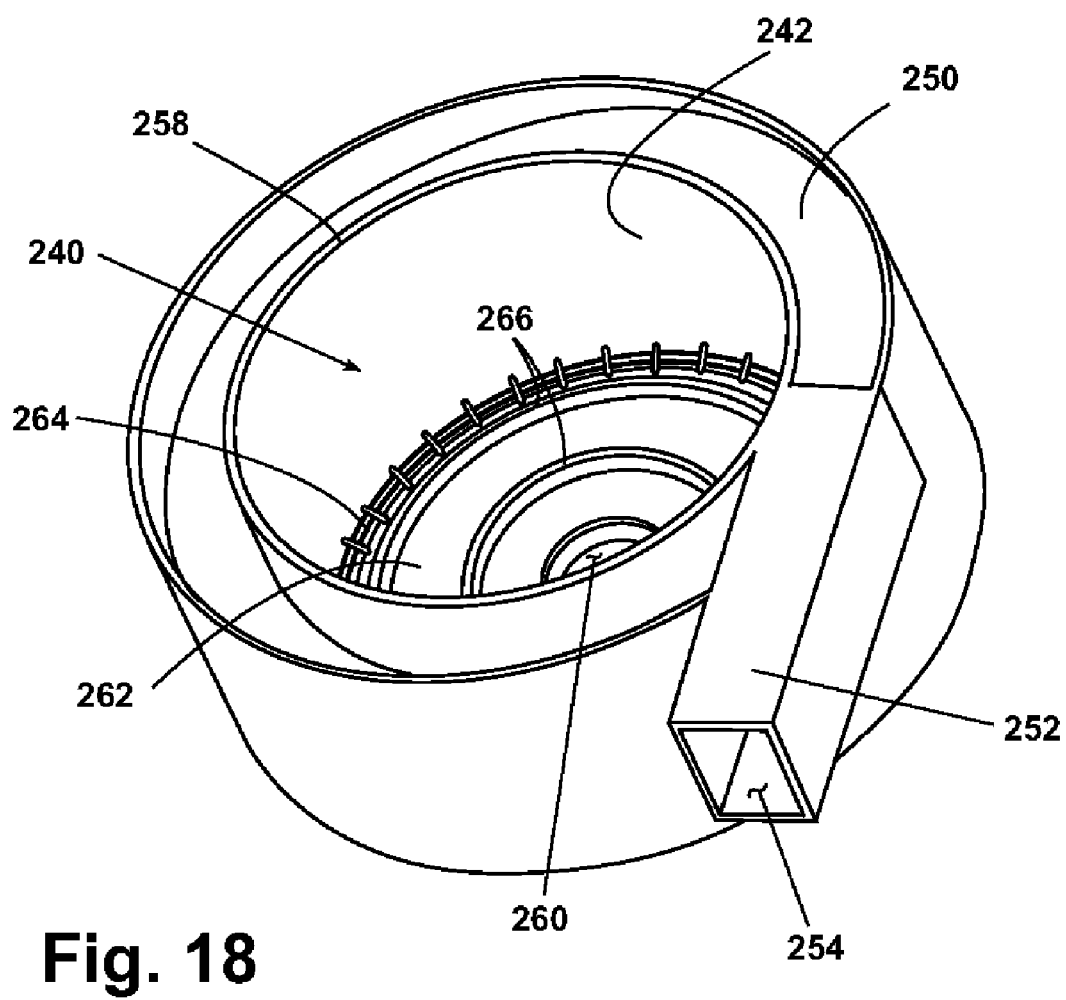
FIG. 18 is an enlarged perspective view of a cyclonic separator of the dirt collection assembly of FIG. 16.
Figure 19:
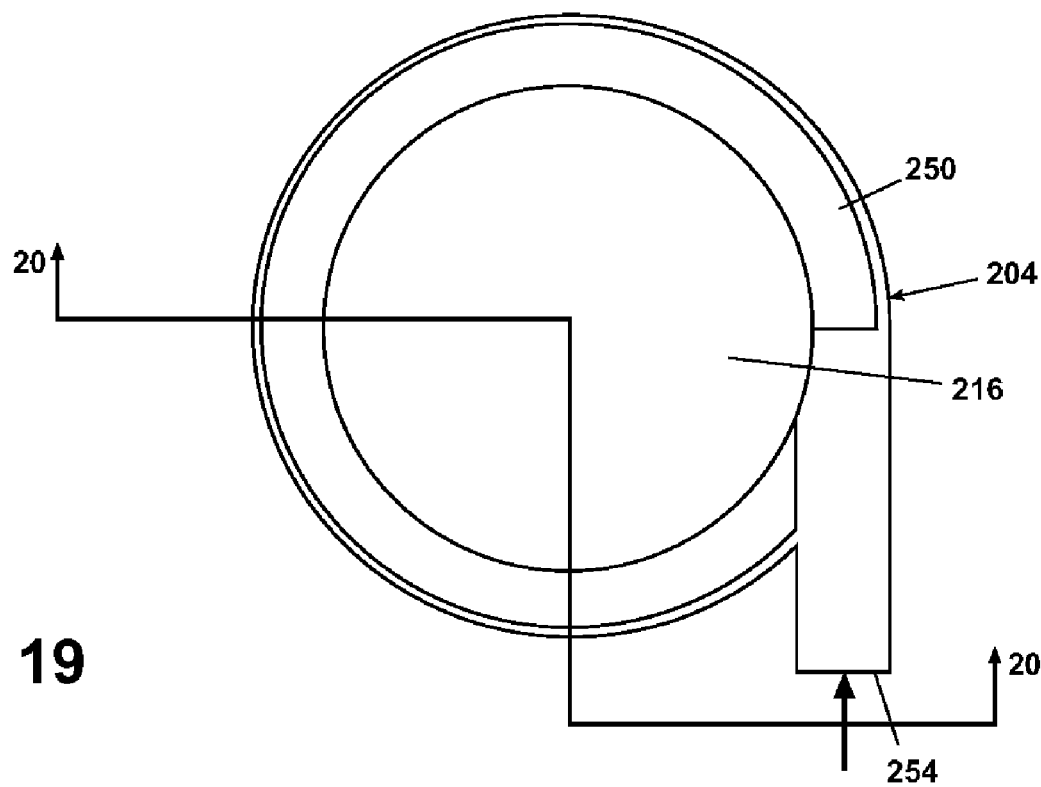
FIG. 19 is a plan view of the dirt collection assembly of FIG. 16.
Figure 20:
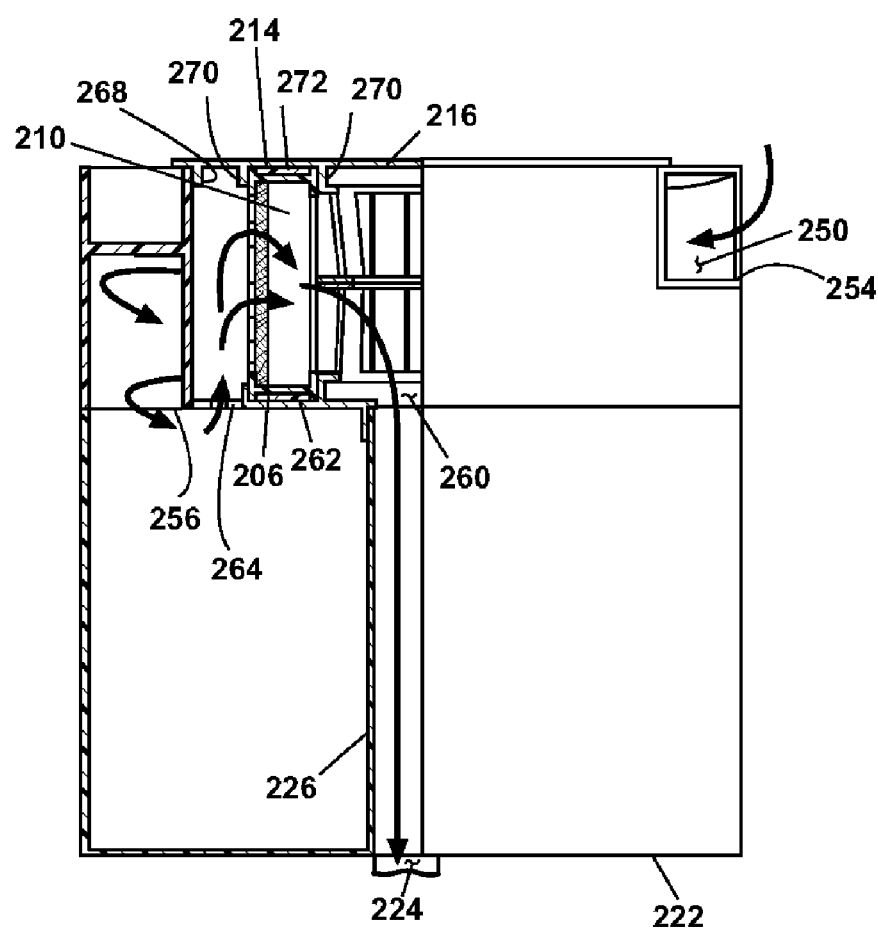
FIG. 20 is a cross-sectional view of the dirt collection assembly taken through line 20—20 of FIG. 19.

A further embodiment of a cyclonic separator 300 is depicted in FIGS. 15 and 15A. The cyclonic separator 300 comprises a dirt bin 310 having a cylindrical configuration with an exterior wall 312, a bottom wall 314 having a central opening 316 integral with a hollow cylindrical shaft 318 extending from bottom wall 314. Shaft 318 includes an upper end 320 and extends coaxially within bin 310 so that upper end 320 extends above an upper end 322 of exterior wall 312 of dirt bin 310. Dirt bin 310 further comprises a tangential inlet opening 324 passing through the exterior wall 312 of the dirt bin 310, located proximate the upper end 322 of the exterior wall 312 of the dirt bin 310.

The cyclonic separator 300 further comprises a cyclonic insert 330 having a substantially hollow cylindrical body 332, cylindrical body 332 shown as having a neck portion 334 in a central area thereof, so that the diameter of the cylindrical body 332 is slightly narrower at neck portion 334. Cylindrical body 332 is further contemplated as being uniform in diameter, i.e. eliminating neck portion 334. Cyclonic insert 330 further comprises an annular bottom portion 336.

Annular bottom portion 336 includes a central opening 338 configured to closely conform to the exterior of the central shaft 318 of the dirt bin 310. Bottom portion 336 is connected to the exterior wall of the cylindrical portion 332 of the cyclonic insert 330, and further includes a separator flange 340. Separator flange 340 extends downwardly at an obtuse angle beyond the exterior wall of the cylindrical body 332.

The cylindrical body 332 of the cyclonic insert 330 has a diameter less than the diameter of the cylindrical dirt bin 310, so that when the cyclonic insert 330 is inserted into the dirt bin 310, a toroidal portion 342 is formed therebetween. The separator flange 340 does not extend to cylindrical wall 312, leaving a gap 344 between the separator flange 340 and the interior of the cylindrical wall 312 of the dirt bin 310.

The interior of the dirt bin 310 is thus divided into two toroidal portions 342, 346, the first toroidal portion 342 being between the cyclonic insert 330 and the wall 312 of the dirt bin 310, and the second toroidal portion 346 formed between the central shaft 318 and the cylindrical wall 312 of the dirt bin 310, beneath the separator flange 340.

The cyclonic insert 330 further comprises an upper annular flange portion 348 integrally formed with the cylindrical body 332 of the cyclonic insert 330, the flange portion 348 having an outer diameter equivalent to the outer diameter of the dirt bin 310 and configured to be received in an engaging and sealing manner on the upper edge 322 of the exterior wall 312 of the dirt bin 310.

The cylindrical body 332 of the cyclonic insert 330 further comprises two wall portions, an impervious upper wall portion 352 and a lower wall portion 354 having a plurality of perforations 356 passing therethrough. Perforations 356 are contemplated as being of uniform size and spacing, or of being arranged in a non-uniform pattern of varying apertures, as required to develop the most advantageous airflow pattern.

The cyclonic insert 330 further includes a plurality of canted vanes 358 arranged in a ring about the interior of the cyclonic insert 330 at the necked portion 334 of the cylindrical body 332. The vanes 358 include a central opening 360 configured to closely receive the central shaft 318 of the dirt bin 310.

The necked portion 334, and the vanes 358, substantially divide the volume between the cyclonic insert 330 and the central shaft 318 of the dirt bin 310 into two toroidal portions 362, 364. The first toroidal portion 362 is bounded on its interior by the central shaft 318 of the dirt bin 310, and on its exterior by the perforated section 354 of the cylindrical portion of the dirt bin 310. The second toroidal portion 364 is bounded on its interior by the central shaft 318 of the dirt bin 310 and on its exterior by the solid portion 352 of the cylindrical portion of the cyclonic insert 330. the second toroidal portion 364 is bounded at its lower end by the vanes 358 and at its upper end by a frusto-conical chamber 368 defined by a frusto-conical wall 376.

The cyclonic separator 300 further comprises a secondary cyclone chamber 370, the chamber 370 comprising an outer cylindrical wall 372, a lower annular wall 374 and frusto-conical wall 376. The bottom wall 374 of the chamber 370 has an annular perimeter 378 for abutting the perimeter edge 350 of the cyclone insert 330 to present a flush appearance and to resist removal of the chamber 370 from the insert 330.

The chamber 370 further comprises a chamber cap 380, being a disk having a depending rim 382 for receipt in an upper portion 384 of the cylindrical chamber 370 in a sealing manner. The exterior wall 372, lower wall 374 and frusto-conical wall 376 of the chamber 370 are integrally formed, forming a substantially toroidal receptacle 386. The frusto-conical wall 376 is shorter than the exterior walls 372 of the chamber 370 resulting in a gap 388 between a top edge 390 of the hollow frusto-conical wall 376 and the lid 380 of the chamber 370.

Prior to assembly, therefore, the cyclonic separator 300 comprises a cylindrical dirt bin 310 having a concentric cylindrical shaft 314 passing from an aperture 316 and a flat bottom 314 to above the upper edge 322 of the dirt bin 310, forming a single toroidal cyclonic airflow chamber therebetween. Inserting the cyclonic insert 330 in a sealing engagement with the upper edge 322 of the dirt bin 310 divides the interior of the dirt bin 310 into two toroidal portion 342, 346 to the outside of the insert 330. The toroidal portions 342, 346 are separated by the separator flange 340 of the cyclonic insert 330, except for a gap 344 between separator flange 340 and wall 312.

The interior of the insert 330 is divided into toroidal sections 362, 364 inside the cylindrical body 332 of the insert 330. The toroidal sections 362, 364 are defined by the vanes 358. The central shaft 318 still projects above the top 322 of the bin 310 and the upper flange 348 of the cyclonic insert 330.

Attaching the secondary cyclone chamber 370 and its lid 380 places the upper end 320 of the central shaft 318 within the hollow frusto-conical wall 376 of the secondary cyclone chamber 370. The cyclonic separator 300 is now sealed from the atmosphere except for the tangential inlet 324 of the dirt bin 310 and the central outlet 316 at the base 314 of the dirt bin 310. The tangential inlet 324 and outlet 316 are fluidly connected through the dirt bin 310, perforations 356 of the cyclonic insert 330, through the toroidal sections 362, 364 within the cyclonic insert 330 and through the upper end 320 of the central shaft 318.

The cyclonic separator, when used in a suction cleaner 396, will have a vacuum source 392 fluidly connected to the outlet opening 316, thereby forming a vacuum within the cyclonic separator 300 and at the tangential inlet 324 to the dirt bin 310. Inlet 324 will be fluidly connected to nozzle opening 396 of a surface cleaning apparatus 394 through a suction flow path 398. Dirt-laden air will be drawn through the inlet 324 into the first toroidal section 342, the air flow having a tangential component due to the orientation of inlet 324. As the dirt-laden air is circulated about the perimeter of the dirt bin 310, the dirt will be driven toward the outer wall 312 of dirt bin 310 and tend to fall towards the bottom wall 314 to the outside of the separator flange 340.

As the air circulates about dirt bin 310, the air will be drawn inwardly toward the perforations 356 in the lower portion 354 of the cylindrical portion 332 of the cyclonic insert 330. Heavier particles of dirt will fall to the bottom of the dirt bin. The separator flange 340 acts to discourage dirt particles from being recirculated in the air flow adjacent the perforations 356.

The air passing through the perforations 356 continues to carry finer particulates that were not heavy enough to be deposited in the bottom of the dirt bin 310. The perforations 356 substantially pass perpendicularly through the surface 354 of the cyclonic insert 330 to further encourage deflection of dirt particles from the perforations and thereby removing them from the airflow.

As the air flow passes through the perforations 356, it begins traveling essentially along the outside of the central shaft 318. It is been found that this air flow still maintains some rotational velocity. In the embodiment shown in FIG. 15, the airflow will strike vanes 358. Vanes 358 will increase the rotational velocity component to the air flow. The air flow in the upper toroidal portion 364 will therefore have a tangential component to encourage additional cyclonic action in the toroidal section 364.

As the air flow travels to the frusto-conical chamber 368, the rotational velocity of the air flow will increase, driving dirt particles toward the frusto-conical wall 376 of the secondary cyclone chamber 370. In addition, the axial velocity components will push the dirt particles to the top opening 390. The tangential component will then direct the dirt particles to the outer secondary cyclonic chamber 370, through the gap 388. With very little airflow in the outer chamber of the secondary cyclonic chamber 370, the velocity of the dirt particles drops dramatically and the dirt particles fall to the bottom 386 of the secondary cyclonic chamber 370.

The remaining airflow, and those particles not having sufficient centripetal energy to be driven to the outside of the frusto-conical wall 376, will be drawn through the top end 320 of the central shaft 316, to be drawn to the vacuum source fluidly connected to the outlet opening 316. A fine particulate filter (not shown) is inserted in the exhaust airstream to remove those fine particulates not extracted by the cyclonic separator.

An additional embodiment of a cyclonic separator 200 for a suction cleaner is shown in FIGS. 16–20. Cyclonic separator 200 comprises a dirt bin 202, a cyclonic housing 204, first and second filter frames 208, 212, first and second filter seals 206, 214, filter medium 210, and filter chamber lid 216.

The dirt bin 202 is cylindrical in configuration, having an outer wall 220, a bottom wall 222 having a central opening 224, and a central cylindrical shaft 226 encompassing the aperture 224, the cylindrical shaft 226 being concentric with the outer wall 220 of the dirt bin 202. The central shaft 226 has an upper end 228 substantially even with an upper end 230 of the dirt bin outer wall 220. The dirt bin thereby comprises a toroidal receptacle encompassed by the outer wall 220 and the central shaft 226, and by the dirt bin lower surface 222 and the upper edges 228, 230 of the central shaft 226 and outer wall 220.

The cyclone housing 204 is cylindrical, having an exterior diameter equal to the diameter of the dirt bin 202. The cyclone housing 204 comprises a central cylindrical filter chamber 240 having an outer wall 242, the diameter of the cylindrical filter chamber 240 being smaller than the exterior diameter of the cyclone housing 204, but concentric therewith. The annular region defined between the outer wall 242 of the filter chamber 240 and the outer wall of the cyclone housing 204 comprises a spiral channel 250. Channel 250 begins at an upper portion 252 of the cyclone housing 204 with an inlet opening 254. The channel 250 then follows the perimeter of the cyclone housing in a downward spiral fashion to a channel outlet 256 on a lower portion of the cyclone housing 204.

The upper portion of the filter chamber 240 comprises a filter chamber opening 258. A lower portion of the filter chamber 240 comprises a central opening 260, an annular filter seat 262 surrounding the central opening 260 on the lower portion of the filter chamber 240, and an annular perforated inlet section 264. The annular filter seat 262 is bounded on its interior and exterior edges by a raised rim 266, each raised rim being annular and perpendicular to the base of the filter chamber 240.

The filter chamber lid 216 is a flat disc having a diameter slightly greater than the diameter of the cylindrical filter chamber 240, and having an annular depending rim 268 inset from the edge of lid 216 and adapted to be closely received within the opening 258 of filter chamber 240. Filter chamber lid 216 further comprises two additional depending annular rims 270 each having a diameter corresponding to one of the rims 266 surrounding the annular filter seat 262 in the lower portion of the filter chamber 240. The rims 270 bound an annular filter seat 272, the annular filter seat 272 being centered on the underside of the circular filter chamber lid 216 for alignment with the filter seat 262.

The first and second filter frames 208, 212 are identical in construction. The filter frames 208, 212 comprise a flat annular mating surface 280 including a pair of pin projections 282 and a pair of pin receiving openings 284 evenly spaced about the perimeter of the mating surface 280 so that the pins 282 of the first filter frame can be received in the openings 284 of the second filter frame, and vice versa, so that the mating surfaces 280 of the first and second filter frames 208, 212 can abut in a flush manner.

Referring to the first filter frame 208 for the purpose of describing the construction of the filter frames 208, 212, the first filter frame 208 further comprises a number of ribs 286 depending from the mating surface 280 of the filter frame 208 in a slightly splayed manner, being substantially perpendicular to the plane of the mating surface 280 but canted slightly away from this center line of the filter frame 208. The ribs 286 terminate in an annular base 290. Based 290 comprises an inner annular rim 288 and an annular ring 292 with a raised outer rim 294. The raised outer rim 294, the ring 292 and the rim 288 form a shallow annular cavity 296 for receiving a lower portion of the filter medium 210. Each of the filter frames 208, 212 further comprises an annular recess 298 on a face opposite the mating surface 280, the recess 298 configured to receive annular filter seal 206, 214.

The filter medium 210 is a hollow cylindrical arrangement of a pleated filter paper, the hollow cylinder having a diameter and wall thickness substantially corresponding to the width of the annular ring 292 of the filter frame 208. The filter medium 210 has a height substantially equal to the distance between the annular rings 292 of the first and second filter frames 208, 212 when the frames 208, 212 are assembled with their respective mating surfaces 280 in abutment.

The cyclone separator 200 is assembled by placing the cyclone housing 204 in a sealing engagement with the upper end 230 of the dirt bin 202. The outer wall of the cyclone housing 204 aligns with the outer wall 220 of the dirt bin 202, and the upper end 228 of the central shaft 226 sealing engages the central opening 260 of the cyclone housing 204.

The filter frame is assembled by placing a first filter seal 206 in the annular recess 298 of the first filter frame 208, placing the hollow cylindrical filter medium 210 over the first filter frame 208 so that the lower portion of the filter medium 210 is received in the annular recess 296 of the first filter frame 208, then inserting the second filter frame 212 into the filter medium 210 until the mating surface 280 of the second filter frame 212 abuts the mating surface 280 of the first filter frame 208 in a flush manner. The upper portion of the filter medium 210 is thus received in the annular recess 296 of the second filter frame 212. The second filter seal is then placed in the annular recess 298 of the second filter frame 212.

The filter assembly is then placed into the cyclone housing 204 so that the annular base of the first filter frame 208 is received in the annular filter seat 262 of the cyclone housing 204. The filter chamber lid 216 can then be placed over the filter chamber opening 258 so that the depending rim 268 resides immediately inside the filter chamber wall 242, and the annular base of the second filter frame 212 can be received in the annular filter seat 272 of the filter chamber lid 216 between the rims 270.

The assembled cyclonic separator is now fluidly sealed from the atmosphere except for the inlet opening 254 of the spiral channel 250, and the outlet opening 224 at the base of the dirt bin 202. The inlet opening 254 and outlet opening 224 are fluidly connected through the spiral channel 250 into the interior of the dirt bin 202 and then through the annular inlet section 264 into the filter chamber 240. Any fluid flow must then pass through the filter medium 210 to reach the central opening 260 at the base of the filter chamber 240, from whence it travels through the central shaft 226 to the outlet opening 224.

In a suction cleaner, the suction source is applied to the outlet opening 224, thereby drawing a vacuum throughout the fluid path just described and the inlet opening 254 is then directed by known structures to a surface or object to be cleaned, thereby drawing dirt laden air into the cyclonic separator. The tangential flow through the spiral channel 250 will reduce the velocity in the particles in the air, causing them to fall under gravity into the toroidal dirt chamber of the dirt bin 202. The air flow is further subjected to a severe change in direction as it must flow upwardly through the annular inlet section 264 of the filter chamber 240 before it can pass through the filter medium 210 to the exhaust outlet 224.

While the invention has been specifically described in connection with certain specific embodiments thereof, it is to be understood that this is by way of illustration and not of limitation. Reasonable variation and modification are possible within the forgoing disclosure and drawings without departing from the spirit of the invention which is defined in the appended claims.

What is claimed is:

1. A vacuum cleaner module comprising:
    a module housing;
    a dirt separation housing removably mounted in the module housing and defining a cyclonic airflow chamber for separating contaminants from a dirt-containing airstream, the housing further comprising an inlet opening for the cyclonic chamber adapted to be connected to a suction cleaning nozzle and an airstream outlet opening in an upper central portion of the dirt separation housing and in communication with the inlet opening;
    an airstream suction source mounted in the module housing and fluidly connected to the cyclonic chamber inlet opening, the cyclonic airflow chamber and the airstream outlet opening to establish and maintain a tangential flow of a dirt-containing airstream within the cyclone airflow chamber as the airstream flows between the cyclonic chamber inlet opening and the airstream outlet opening for separating dirt from the air stream in the cyclonic airflow chamber;
    a support element mounted in an upper portion of said dirt separator housing;
    a dirt-collecting chamber within the module housing and beneath the cyclonic airflow chamber to collect dirt separated from the dirt-containing airstream in the cyclonic airflow chamber; and
    a separator plate mounted to a lower portion of the support element above the dirt-collecting bin, and separating the cyclonic airflow chamber from the dirt collecting chamber.

2. A vacuum cleaner according to claim 1 wherein the support element is cylindrical and has openings for passage of the dirt-separated airstream prior to exit of said airstream from said dirt separation housing through the airstream outlet.

3. A vacuum cleaner according to claim 2 and further comprising a filter element between the cyclonic airflow chamber and the support element.

4. A vacuum cleaner according to claim 3 wherein the filter element is a fine mesh.

5. A vacuum cleaner according to claim 1 wherein the separator plate extends radially from the support element toward the housing.

6. A vacuum cleaner according to claim 5 wherein the separator plate forms a gap with the housing for passage of dirt particles from the cyclone separation chamber to the dirt-collecting chamber.

7. A vacuum cleaner according to claim 6 wherein the gap between the separator plate and the housing is annular.

8. A vacuum cleaner according to claim 7 wherein the separator plate is circular and the housing has a cylindrical wall adjacent the separator plate.

9. A vacuum cleaner according to claim 5 wherein the separator plate is circular and the housing has a cylindrical wall adjacent the separator plate.

10. A vacuum cleaner according to claim 2 wherein the cylindrical support element, the separator plate and the dirt separation housing define a toroidal chamber that forms the cyclonic airflow chamber.

11. A vacuum cleaner according to claim 10 and further comprising a filter positioned between the cyclonic airflow chamber and the airstream outlet opening.

12. A vacuum cleaner according to claim 11 wherein the filter comprises a fine mesh.

13. A vacuum cleaner according to claim 1 and further comprising a filter positioned downstream of the airstream outlet opening.

14. A vacuum cleaner according to claim 1 wherein the suction source is mounted beneath the dirt separation housing.

15. A vacuum cleaner according to claim 14 wherein the suction source has an inlet downstream from the airstream opening to draw the dirt-containing airstream into the cyclonic airflow chamber.

16. A vacuum cleaner according to claim 1 wherein the dirt separation housing also defines the dirt-collecting chamber.

17. A vacuum cleaner according to claim 1 and further comprising a dirt cup that defines the dirt collecting chamber and the dirt cup is removably mounted to the dirt separation housing.

18. A vacuum cleaner according to claim 17 wherein the dirt cup is also removably mounted to the module housing.

19. A vacuum cleaner according to claim 1 and further comprising a dirt cup that defines the dirt collecting chamber and the dirt cup is removably mounted to the module housing.

20. A vacuum cleaner according to claim 1 wherein the cyclonic airflow chamber is formed in part by a tangential helical ramp.

21. A vacuum cleaner according to claim 20 and further comprising a direction change portal between the cyclonic airflow chamber and the airstream outlet opening in the dirt separation housing so that the airstream changes whereby the airstream changes direction before passing through the airstream outlet opening.

22. A vacuum cleaner module according to claim 1 wherein the dirt separation housing further comprises a second cyclonic airflow chamber having an airstream inlet in fluid communication with the outlet of the first cyclonic airflow chamber and an airstream outlet in communication with the airstream suction source.

23. A vacuum cleaner module according to claim 22 wherein the second cyclonic airflow chamber is at least in part defined by a frustroconical wall that decreases in diameter from a lower end to an upper end.

24. A vacuum cleaner module according to claim 23 and further comprising a fluid passage between the airstream outlet of the first cyclonic airflow chamber and the airflow inlet of the second cyclonic airflow chamber.

25. A vacuum cleaner comprising;
a dirt separator housing defining a cyclonic airflow chamber for separating contaminants from a dirt-containing airstream, said dirt separator housing further comprising a cyclonic chamber inlet and an airstream outlet in fluid communication with each other;
an airstream suction source fluidly connected to the cyclonic airflow chamber for transporting dirt-containing air from a source of a dirt-containing airstream to the cyclonic airflow chamber, said suction source selectively establishing and maintaining the dirt-containing airstream from said source of a dirt-containing airstream to said cyclonic chamber inlet and for maintaining tangential flow of the dirt-containing airstream within the cyclone airflow chamber for separating dirt from the air stream in the cyclonic airflow chamber;
a support element positioned within said dirt separation housing and mounting a separator plate that forms a toroidal chamber within the dirt separation housing with a cylindrical side wall and upper wall of the dirt separation housing;
a dirt-collecting bin beneath the separator plate within the dirt separation housing and forming a dirt collecting chamber; and
wherein the relative cross-sectional areas of the separator plate with respect to the housing cross sectional area at the separator plate is in the range of 0.75 to 0.95.

26. A vacuum cleaner according to claim 25 wherein the airstream outlet is in a lower portion of the housing.

27. A vacuum cleaner according to claim 25 wherein the relative cross-sectional area of the separator plate with respect to the housing cross sectional area is in the range of 0.8 to 0.92.

28. A vacuum cleaner according to claim 25 wherein the relative cross-sectional area of the separator plate with respect to the housing cross sectional area is about 9.

29. A vacuum cleaner comprising:
a housing defining a first cyclonic airflow chamber for separating contaminants from a dirt-containing airstream, said housing further comprising an airstream inlet and an airstream outlet in fluid communication with said first cyclonic airflow chamber;
a nozzle base including a suction opening, said suction opening being fluidly connected with said airstream inlet of the first cyclonic airflow chamber;
the housing further including a second cyclonic airflow chamber having an airstream inlet in fluid communication with the outlet of the first cyclonic airflow chamber and an airstream outlet;
the second cyclonic airflow chamber is at least in part defined by a frustroconical wall that decreases in diameter from a lower end to an upper end,
a fluid passage between the airstream outlet of the first cyclonic airflow chamber and the airflow inlet of the second cyclonic airflow chamber;
a first dirt-collecting bin beneath said first cyclonic airflow chamber for collecting dirt separated from the airstream in the first cyclonic airflow chamber; and
an airstream suction source fluidly connected to the suction opening and to the first and second cyclonic airflow chambers for transporting a dirt-containing airstream from the suction opening through the first and second cyclonic airflow chambers, wherein the suction source is adapted to selectively establish and maintain the flow of the dirt-containing airstream from the suction opening through said first and second cyclonic airflow chambers.

30. A vacuum cleaner according to claim 29 wherein the airstream suction source is downstream of the outlet of the second cyclonic airflow chamber.

31. A vacuum cleaner according to claim 29 wherein the outlet of the first cyclonic airflow chamber is formed by a perforated wall.

32. A vacuum cleaner according to claim 31 wherein the first cyclonic airflow chamber is formed at least in part from a substantially cylindrical housing wall and the perforated wall is spaced radially inwardly of the substantially cylindrical housing wall.

33. A vacuum cleaner according to claim 32 wherein the perforated wall is substantially cylindrically shaped.

34. A vacuum cleaner according to claim 29 wherein the second cyclonic airflow chamber has an opening at an upper portion thereof for passage of dirt separated from the airstream.

35. A vacuum cleaner according to claim 29 and further comprising a second dirt-collecting bin in communication with an upper end of the second cyclonic air flow chamber for collection of dirt from the airstream in the second cyclonic airflow chamber.

36. A vacuum cleaner comprising:
a suction nozzle opening adapted to draw dirt from a surface to be cleaned;
a cyclonic separator having an inlet opening communicating with the suction nozzle and an outlet opening for exhausting cleaned air;
an airstream suction source fluidly connected to cyclonic separator outlet opening for selectively establishing and maintaining a dirt-containing airstream from the suction nozzle opening through the cyclonic separator;
wherein the cyclonic separator comprises an upstream cyclone and a downstream cyclone;
the upstream cyclone including a first end and a second end, and the downstream cyclone having a first end and a second end,
wherein the upstream cyclone is substantially cylindrical in shape between the first and second ends thereof,
wherein the upstream and downstream cyclones are arranged relative to one another so that the orientation of the downstream cyclone is substantially inverted with respect to the orientation of the upstream cyclone, and
wherein the downstream cyclone is frusto-conical in shape between the first and second ends thereof.

37. The vacuum cleaner according to claim 36 and further comprising a perforated plate in a flow path between the upstream and downstream cyclones.

* * * * *